United States Patent [19]

Bhavsar

[11] Patent Number: 4,482,853
[45] Date of Patent: Nov. 13, 1984

[54] COMPOSITE CONTROL FOR SOFT START AND DYNAMIC BRAKING OF A THREE-PHASE INDUCTION MOTOR

[75] Inventor: Manubhai R. Bhavsar, Ontario, Calif.
[73] Assignee: Reuland Electric Company, Industry, Calif.
[21] Appl. No.: 295,489
[22] Filed: Aug. 24, 1981
[51] Int. Cl.³ .......................... H02P 1/28; H02P 3/24
[52] U.S. Cl. .................................. 318/778; 318/759
[58] Field of Search ............... 318/778, 759, 760, 761, 318/762, 809, 799, 729; 323/321

[56] References Cited

U.S. PATENT DOCUMENTS

| | | | |
|---|---|---|---|
| 3,376,485 | 4/1968 | Shibata et al. | 318/799 |
| 3,514,682 | 5/1970 | Corex | 318/369 |
| 3,573,580 | 4/1971 | Shinozaki | 318/778 |
| 3,708,734 | 1/1972 | Rowe | 318/762 |
| 3,809,979 | 5/1974 | Zarth | 318/762 |
| 3,866,097 | 2/1975 | Anzai et al. | 318/761 |
| 3,897,595 | 7/1975 | Fearno | 318/762 |
| 4,070,605 | 1/1978 | Hoeppner | 318/809 |
| 4,072,880 | 2/1978 | Oshima et al. | 323/321 |
| 4,151,453 | 4/1979 | Suzuki et al. | 318/762 |
| 4,176,306 | 11/1979 | Asano et al. | 318/809 |
| 4,328,459 | 5/1982 | McLeod, Jr. | 323/321 |
| 4,361,793 | 11/1982 | Nordell | 318/729 |
| 4,404,511 | 9/1983 | Nola | 318/729 |

Primary Examiner—David Smith, Jr.
Attorney, Agent, or Firm—Gene W. Arant

[57] ABSTRACT

A control circuit for a three phase induction motor includes a voltage controller having a silicon controlled rectifier in each of a first, second and third supply line connected to the motor. The control circuit further includes a first, second and third phase control means for controlling the firing angles of the respective silicon controlled rectifiers, a circuit for providing a positive ramp signal, and a circuit for providing a constant level signal. A starter circuit includes a "run" push button and a "brake" push button. The depressing of the "run" push button connects a three phase power supply to the supply lines of the voltage controller and causes the positive ramp signal to be applied to the first, second and third control means to control the firing angles of the silicon controlled rectifiers to provide a soft start for the motor. The subsequent depressing of the "brake" push button renders the second and third phase control means inoperable thus terminating the running of the motor and applies the constant level signal in place of the positive ramp signal to the first phase control means to control the firing angle of the silicon controlled rectifier in the first supply line to thereby provide a D.C. current for braking the cruising motor.

12 Claims, 11 Drawing Figures

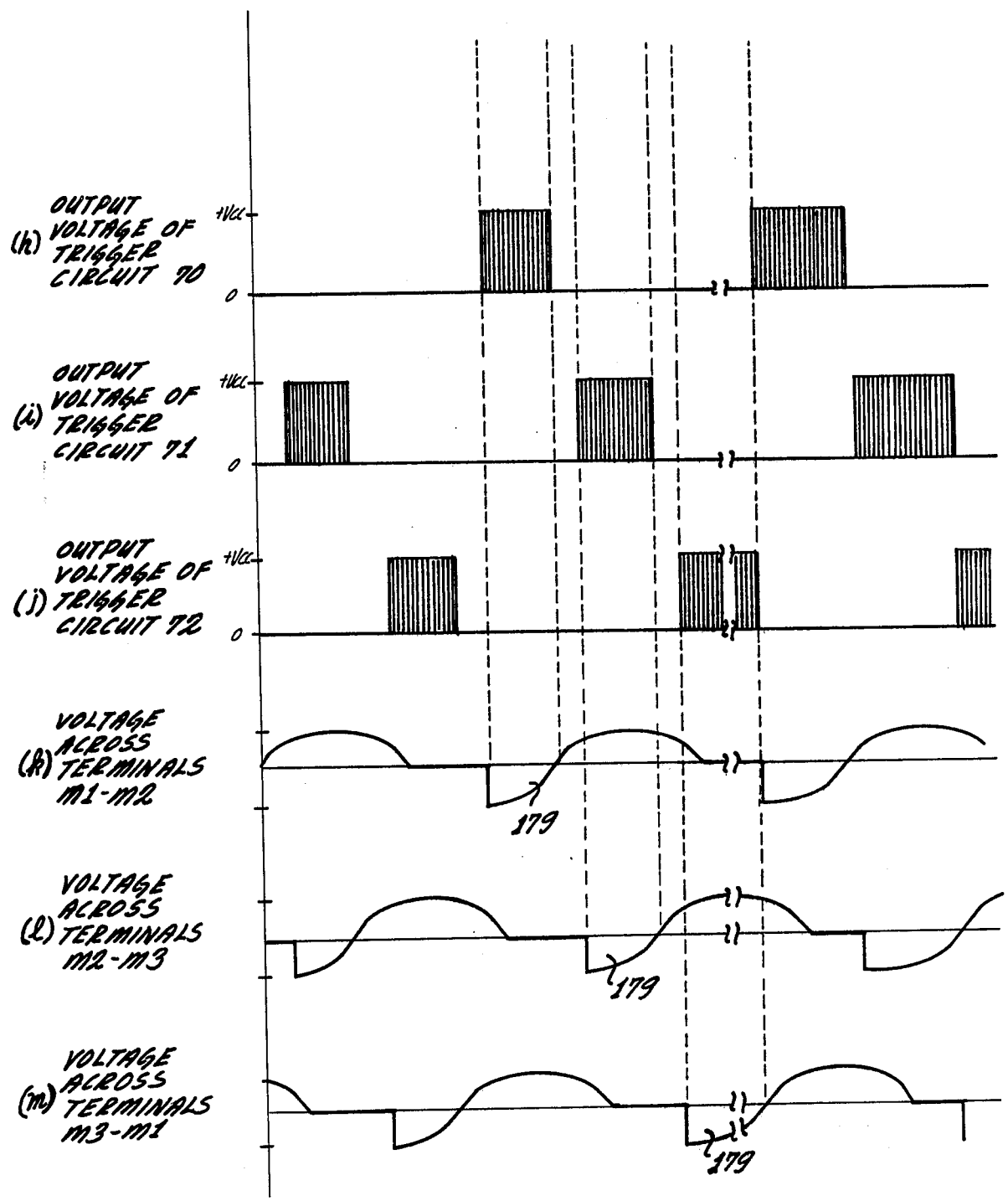
FIG. 5 [CONT.]

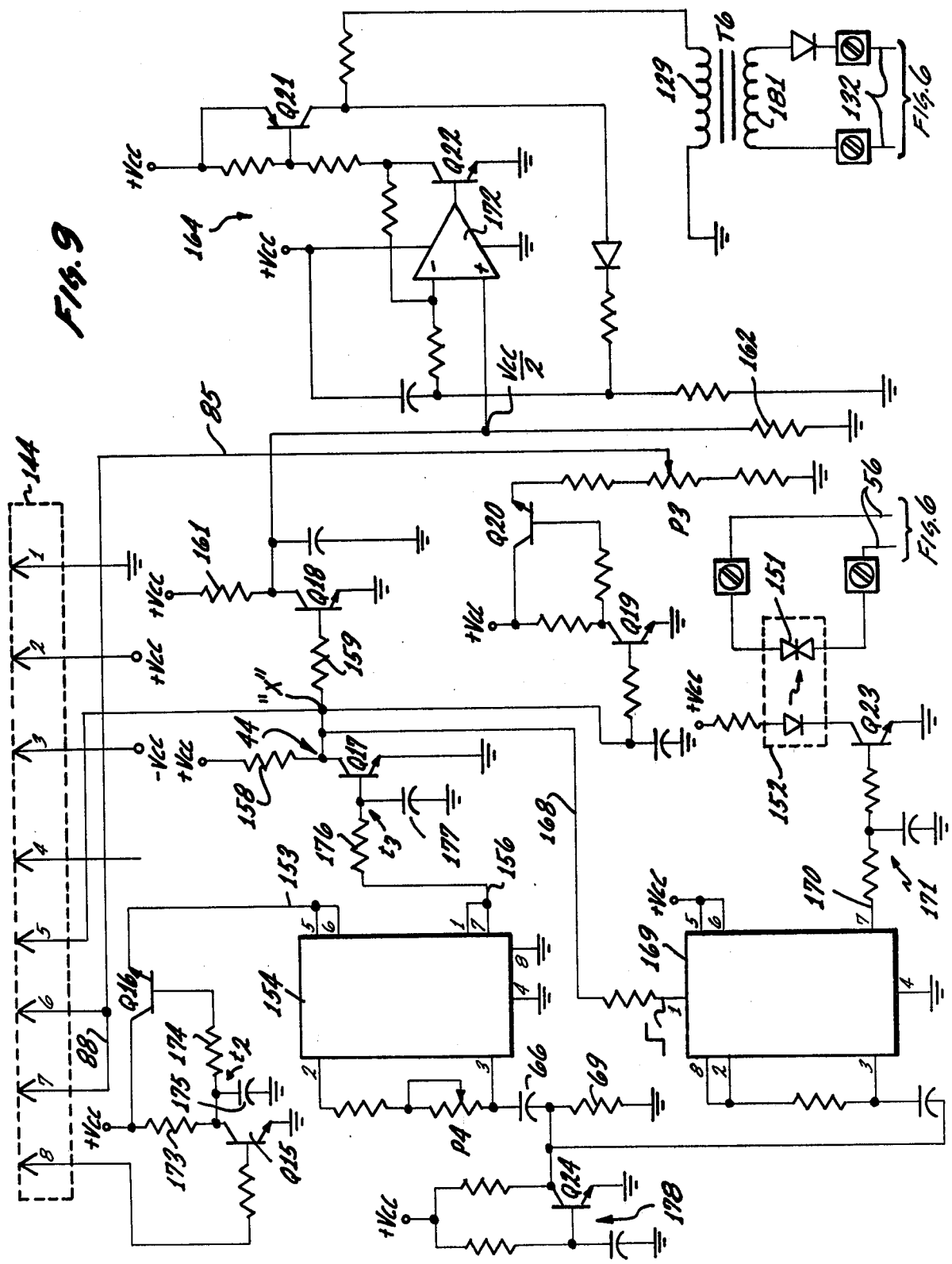

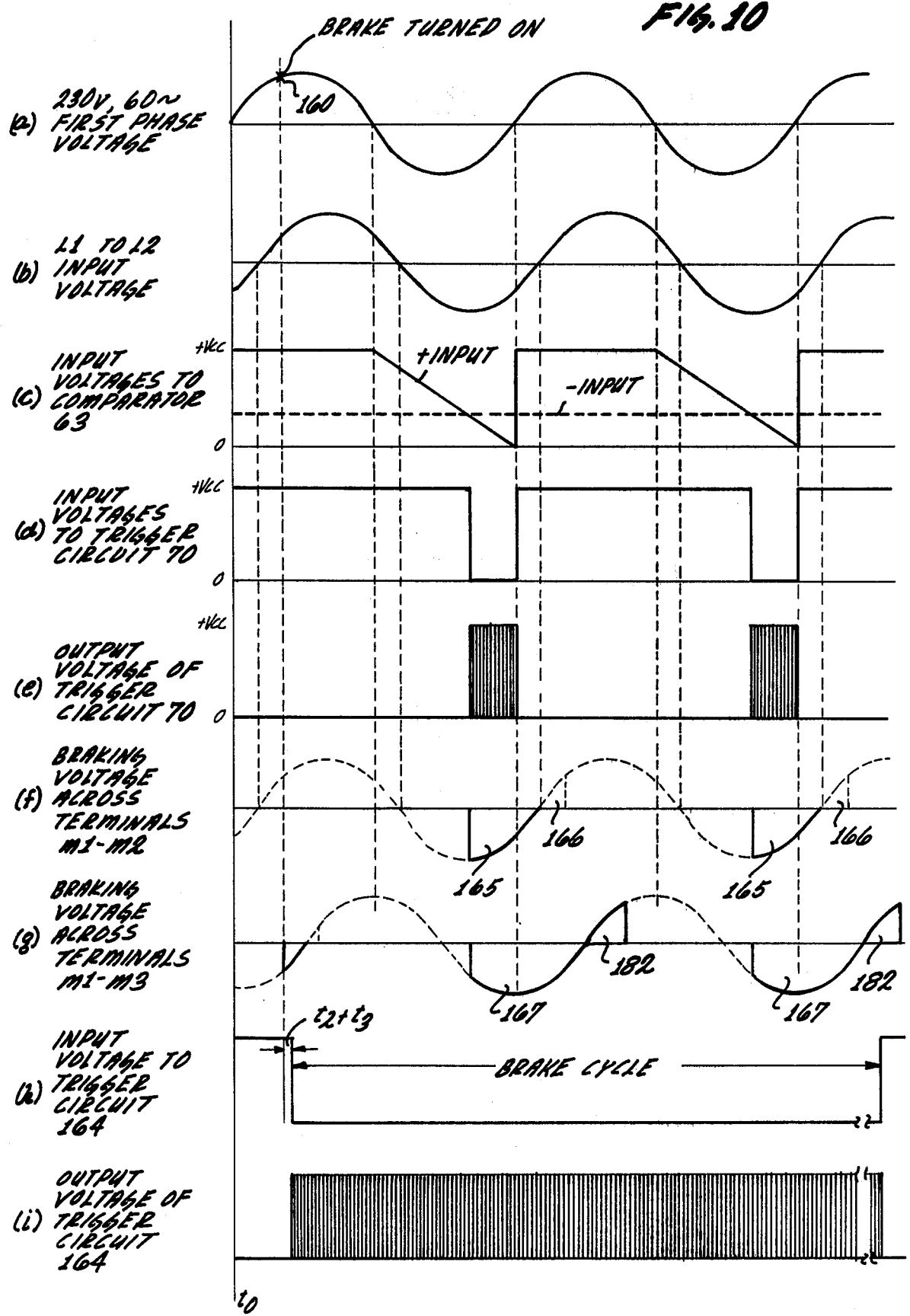

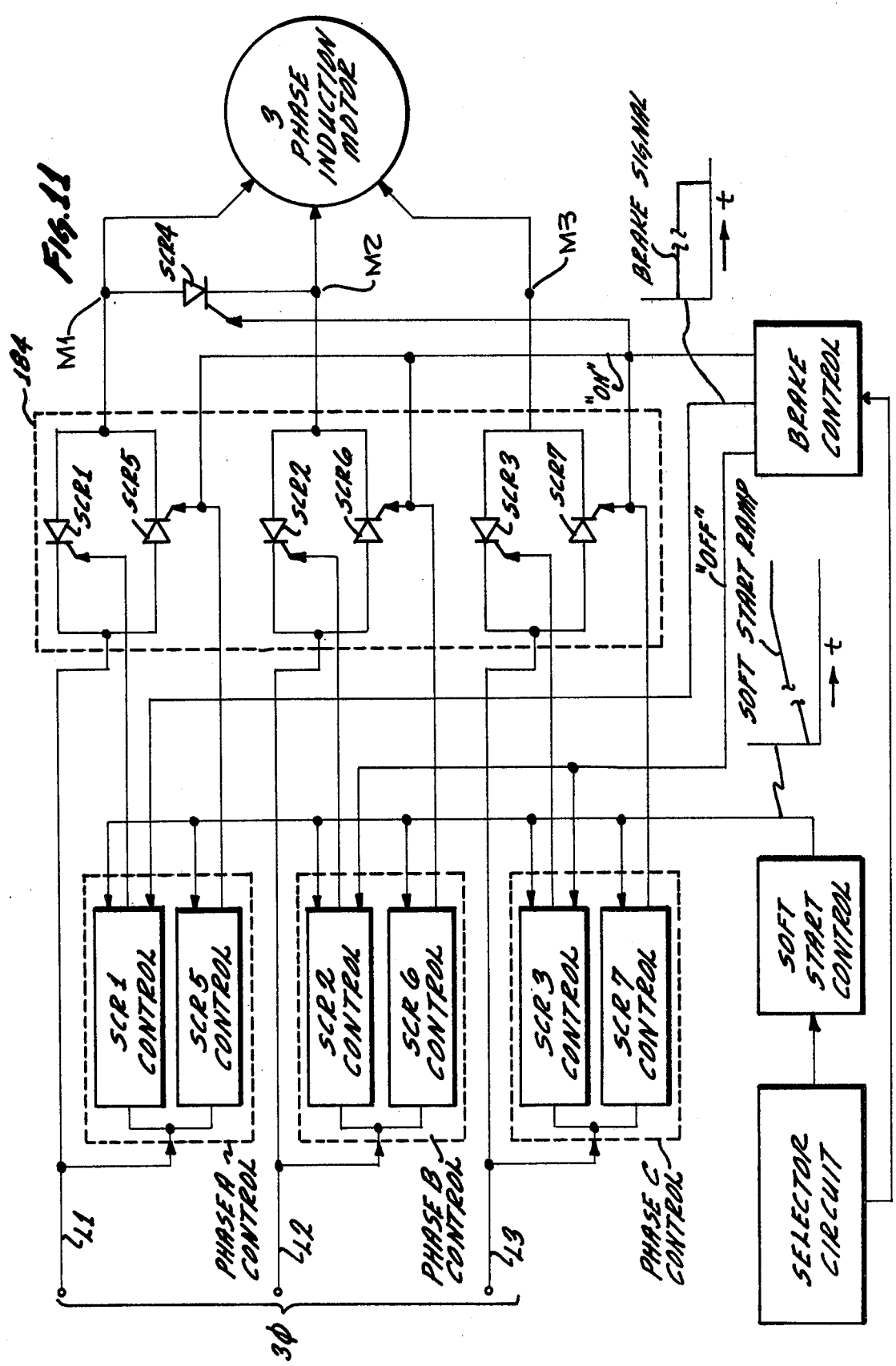

4,482,853

COMPOSITE CONTROL FOR SOFT START AND DYNAMIC BRAKING OF A THREE-PHASE INDUCTION MOTOR

HEADING

Background of the Invention
Summary of the Invention
Drawing Summary
System Arrangement with Half-Wave Rectifier (FIG. 1): Preferred Embodiment
Soft Start Operation, in General (FIGS. 1-5)
Preliminary Operating Conditions for the Soft Start Circuit
Selector Circuit Operation
Generating the Starting Voltage Ramp
Phase Control Circuits
Waveforms for Soft Start Operation
Operation at Full Motor Speed
Packaging the Circuitry for add-on Brake Attachment
Theory of Brake Operation
Brake Circuitry and Waveforms (FIGS. 6-10)
Eliminating Circuit Duplication
System Arrangement with Full-Wave Voltage Controller (FIG. 11): Second Embodiment
Claims

RELATED APPLICATIONS

This application is an improvement over my copending application, Ser. No. 262,403 which was filed May 11, 1981 which is assigned to the same assignee as the present application. Said copending application is expressly abandoned but not the invention therein.

BACKGROUND OF THE INVENTION

This invention relates to controls for three phase induction motors and more particularly to a combined soft start and dynamic braking control for such a motor.

A three phase induction motor is operated by connecting a three phase power supply to the stator thereof to produce a rotating magnetic flux field which, in turn, causes the rotor of the motor to rotate.

It is well known in the art to connect the three phase power supply to the stator by means of either a full-wave or a half-wave voltage controller that incorporates silicon controlled rectifiers, and to control the firing angles of the rectifiers so as to gradually increase the supply of current to the stator. In this manner, a soft start is provided for the motor, i.e., the motor is brought up to speed in a gradual manner.

It is further well known in the art to dynamically brake a three phase motor, when the three phase power has been disconnected from the motor, by rectifying one phase of the supply voltage to provide a single pulsating D.C. current to the stator windings. This in turn induces a stationary magnetic flux field in the stator which brakes the cruising rotor of the motor.

In the prior art it has been necessary to provide separate control units to achieve the soft start and the dynamic braking action. These dual controls are not only expensive but also cumbersome because of the space taken up by such separate units which necessitate many electrical connections to them.

SUMMARY OF THE INVENTION

The control circuit in accordance with the present preferred embodiment of the invention utilizes a half-wave voltage controller in the three supply lines provided for connecting a three phase A.C. power supply to a three phase induction motor. The halfwave voltage controller includes a silicon controlled rectifier and a diode inversely connected in parallel in each of the three supply lines. As well known, each of the supply lines receives one of the three phase voltages of the three phase supply, each of which lags the previous phase voltage by a phase angle of 120°. Thus, in each supply line, the diode provides the current flow therethrough for each positive half cycle of a phase voltage while the silicon controlled rectifier controls current flow therethrough for each negative half cycle of the phase voltage.

In addition to these three silicon controlled rectifiers in the three supply lines, a fourth silicon controlled rectifier is connected across the motor ends of two of the supply lines.

The conduction through each of the silicon controlled rectifiers is controlled by its own phase control which includes, an integrator, a comparator and a trigger circuit. In each phase control a sawtooth waveform is generated by its integrator which is synchronized with the zero crossings of its phase voltage. This sawtooth waveform is applied to its comparator and compared with a timing signal to provide a pulse that turns on its trigger circuit and determines the firing angle of its associated silicon controlled rectifier.

When the control circuit operates as a soft start for the motor, the free wheeling silicon controlled rectifier is turned off and the three silicon controlled rectifiers in the three supply lines are controlled by supplying a common positive ramp timing signal to each of the comparators to there provide for gradually supplying the three phase power to the motor to control its acceleration. The phase controls then maintain full conduction through the silicon controlled rectifiers in the three supply lines to enable the motor to run at its full rated speed.

When it is desired to stop the motor, the control circuit of the present invention operates to turn on and maintain firing of the free wheeling silicon controlled rectifier, to discontinue the operation of the silicon controlled rectifiers in two of the supply lines by disabling their phase controls, and to supply a constant level timing signal to the comparator of the remaining phase control to cause the silicon controlled rectifier in the remaining supply line to conduct for a fixed portion of each negative half cycle. As a result, a pulsating D.C. current is caused to flow to brake the motor. During the braking operation, the free wheeling silicon controlled rectifier provides for absorbing the inductive kickback generated at the end of each negative half cycle of the phase voltage conducting through the third silicon controlled rectifier.

The control circuit in accordance with a second embodiment of the invention utilizes a full-wave voltage controller in the three supply lines provided for connecting the three phase A.C. power supply to the motor.

In this embodiment, the full-wave voltage controller includes a pair of silicon controlled rectifiers inversely connected in parallel in each of the three supply lines. As before, each of the supply lines receives one of the phase voltages of the three phase supply, each of which lags the previous phase voltage by a phase angle of 120°. Thus, in each supply line one of the silicon controlled rectifiers controls the current flow therethrough during each positive half cycle of the phase voltage while the other silicon controlled rectifier controls the current flow therethrough during the negative half cycle of each phase voltage.

In addition to these six silicon controlled rectifiers in the three supply lines, a seventh silicon controlled rectifier is connected across the motor ends of two of the supply lines.

Inasmuch as one of the silicon controlled rectifiers in each supply line conducts during the positive half of each cycle and the other conducts during the negative half of each cycle, separate positive and negative half-wave phase controls are provided for each of the silicon controlled rectifiers. Each of these phase controls comprises an integrator, a comparator and a trigger circuit. In each positive half-wave phase control a sawtooth waveform is generated by its integrator which is synchronized with the zero crossings of the phase voltage it receives. This sawtooth waveform is applied to the comparator and compared with a timing signal to provide a pulse that turns on a trigger circuit and determines the firing angle of a silicon controlled rectifier oriented to conduct during the positive half cycle. Likewise, in each negative half-wave phase control, the sawtooth waveform is generated by its integrator which is synchronized with the zero crossings of the inverted phase voltage. This sawtooth waveform is applied to the comparator and is compared with a timing signal to provide a pulse that turns on the trigger circuit and determines the firing angle of a silicon controlled rectifier oriented to conduct during the negative half cycle.

When the control circuit of the second embodiment operates as a soft start for the motor, the free wheeling silicon controlled rectifier is turned off and the six silicon controlled rectifiers in the supply lines are controlled by supplying a positive ramp timing signal to each of the comparators to thereby provide for gradually supplying the three phase power to the motor to control its acceleration. The phase controls then maintain full conduction through the six silicon controlled rectifiers in the three supply lines to enable the motor to run at its full rated speed.

When it is desired to stop the motor, the control circuit operates to turn on and maintain the firing of the free wheeling silicon controlled rectifier, to discontinue the operation of one of the silicon controlled rectifiers in each of two of the supply lines that is conducting the negative half cycles, and to turn on and maintain the firing of the other of the silicon controlled rectifier in each of said two supply lines. In addition, a constant level timing signal is supplied to the comparator of the remaining phase control to cause the silicon controlled rectifier in the remaining supply line to conduct for a fixed portion of each negative half cycle. As a result, a pulsating D. C. current similar to that of the first embodiment, is caused to flow through the silicon controlled rectifiers that are turned on in the two supply lines into the motor and then out of the silicon controlled rectifier that is controlled to conduct for fixed portion of each negative half cycle to thereby brake the motor. During the praking operation the free wheeling silicon controlled rectifier provides for absorbing the inductive kickback generated at the end of each negative half cycle of the phase voltage conducting through the third silicon controlled rectifier in the remaining supply line.

Accordingly, the primary object of the present invention is to provide a control circuit which operates both as a soft start control and as a dynamic brake for a three phase induction motor.

Another object of the present invention is to provide a low cost, single unit, which operates both as a soft start control and as a dynamic brake for a three phase induction motor.

Yet another object of the present invention is to provide a soft start control circuit for a three phase induction motor which is so arranged that additional circuits can be readily attached thereto, whereby the combination of circuits will then function both as a soft start control and as a dynamic brake for the motor.

These and other objects and advantages of the present invention will appear more fully upon consideration of the specific illustrative embodiment as shown in the accompanying drawings.

DRAWING SUMMARY

FIG. 1 is a schematic diagram of a three phase induction motor powered by a half-wave voltage controller which incorporates the combined soft start control and dynamic brake control of the present invention;

FIGS. 2, 3, and 4 together show the detailed circuitry of the voltage controller and soft start control in accordance with FIG. 1, but not including some of the circuits that are required for the brake control;

FIGS. 5(a) through 5(m) show various wave forms associated with the operation of the soft start control circuit as illustrated in FIG. 2;

FIGS. 6, 7, and 8 show the same detailed circuitry for the soft start control as is shown in FIGS. 2, 3, and 4, but with minor modifications that are needed to adapt it for the attachment of an auxiliary brake control circuit thereto;

FIG. 9 is a schematic diagram of the auxiliary brake control circuit that may be attached to the circuitry of FIGS. 6, 7, and 8 in order to provide a composite control system in accordance with FIG. 1;

FIG. 10 illustrates wave forms that occur during the braking action accomplished by the circuits of FIGS. 6 through 9; and FIG. 11 is a schematic diagram of the second embodiment of the invention incorporating a full-wave voltage controller.

SYSTEM ARRANGEMENT WITH HALF-WAVE RECTIFIER (FIG. 1)

Preferred Embodiment

Figure 1:
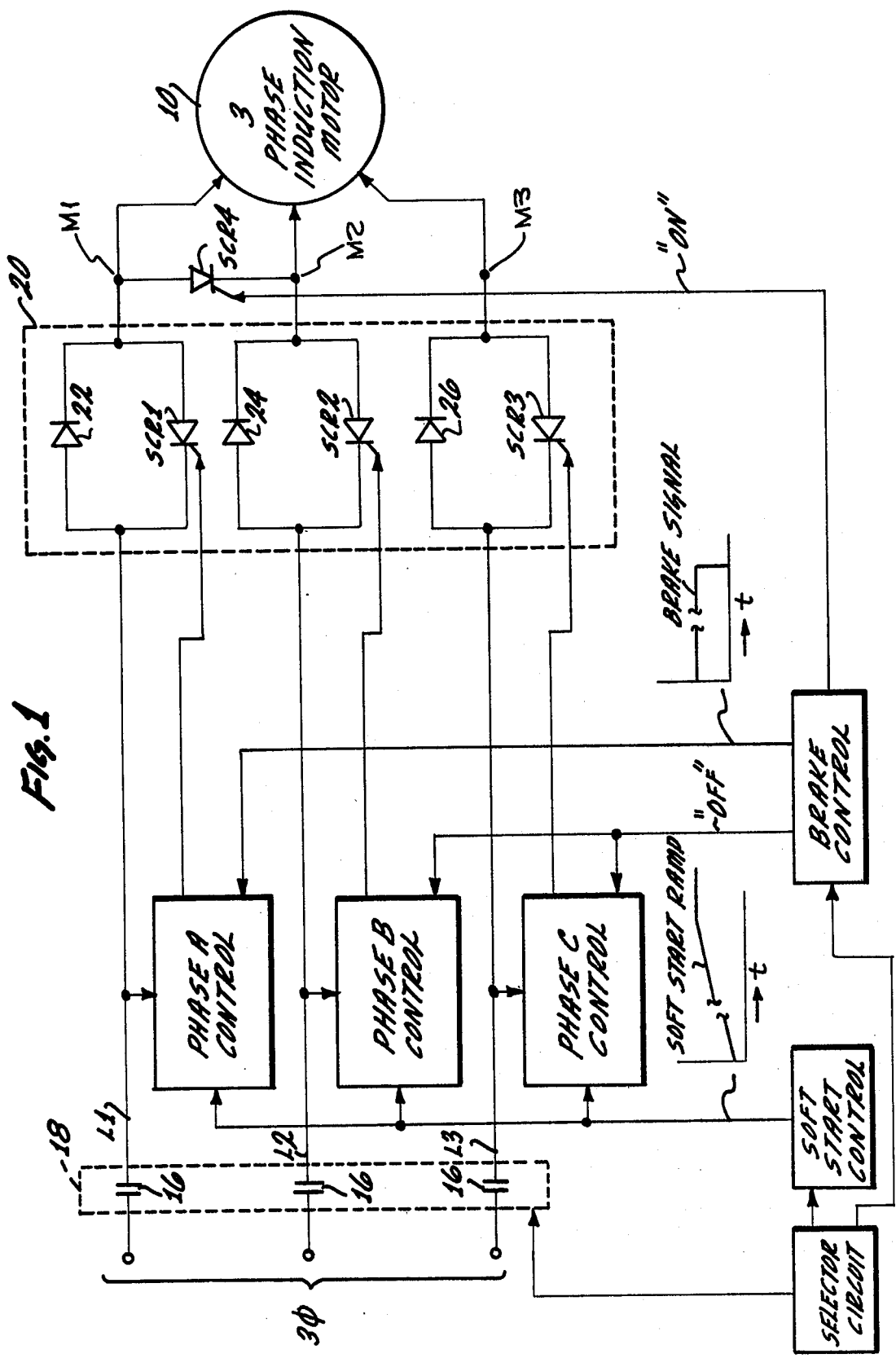

Reference is now made to FIG. 1 of the drawing which illustrates in a schematic fashion the presently preferred embodiment of the invention.

At the left hand side of the drawing are supply lines L1, L2, and L3 coming from a source of three phase voltage. At the right hand side of the drawing is shown a three phase induction motor 10. In general, the function of the system is to provide power to the motor in a controlled fashion. More specifically, a single control apparatus is used for starting the motor slowly under load, then operating it continuously at its running speed, and thereafter braking it to a controlled stop.

A motor contactor 18 has a set of three contacts 16, each of which is placed in a respective one of the incoming lines L1, L2, L3. The operation of the contactor 18 is controlled by a Selector Circuit. Also controlled by the Selector Circuit are a Soft Start Control, and a Brake Control. In general, one actuation of the Selector Circuit (as for example, by pushing a RUN button) will both close the contacts 16 of contactor 18 and also initiate operation of the Soft Start Control. The operation of the Soft Start Control will provide power to the motor in increments so that the motor can be started under load in a gradual manner which will avoid damage both to the motor and to the load and at the same time will avoid any significant disruption of the power supply system. When full speed is reached, the motor will continue to operate at that speed. Then when it is desired to stop the motor, the Selector Circuit is again actuated, as for example, by pushing a BRAKE button. This action will shut off the Soft Start Control and will also initiate operation of the Brake Control. Then when braking action is completed, the Selector Circuit will automatically open contacts 16 of contactor 18.

The purpose of the Soft Start Control is to generate a timing voltage to permit gradual increases in current supplied to the motor. Typically this is a positive ramp voltage, and with a supply frequency of 60 hertz, the starting ramp voltage is of increasing magnitude throughout many cycles of the line voltage. For example, the duration of the starting ramp might be as little as about one second or as much as about thirty seconds, but the exact time will depend upon the mechanical characteristics of the motor and the mechanical characteristics of the load and the starting requirements which are specified for them.

Initial actuation of the Selector Circuit closes the contacts of magnetic contactor 18. However, no current is flowing through the windings since the SCRs are not conducting.

In line L1 a silicon controlled rectifier SCR1 is connected in series and is also in an inverse parallel relationship to diode 22. In similar fashion, in the other supply lines rectifiers SCR2 and SCR3 are connected in an inverse parallel relationship to diodes 24 and 26, respectively. During each negative half cycle of the applied line voltage the corresponding silicon controlled rectifier will conduct after it has been turned on, but in order to turn it on a trigger signal must be applied to its gate lead.

Hence there is provided a Phase A Control whose function is to control the firing angle of rectifier SCR1 by selectively turning on its gate lead. Phase A Control receives an input signal between line L1 and ground, and at the appropriate times, supplies an output to the gate of rectifier SCR1 so that the rectifier will be triggered to the 'ON' or conducting state. The inherent operation of the rectifier is such that when the voltage polarity applied between its anode and cathode terminals reverses, the current conduction will then cease. Current will not be conducted again until the next negative half cycle of the applied voltage, and then it will commence only at such point of time as the gate lead is triggered.

There is also a Phase B Control which receives an input signal from supply line L2 and provides an output signal to the gate lead of rectifier SCR2. Again, Phase B Control provides trigger pulses only under appropriate conditions at the appropriate time with the result that rectifier SCR2 will conduct during each negative half cycle of the applied voltage during the time subsequent to its being triggered.

Also included in the system is a Phase C Control which is controlled from the supply line L3 and provides trigger pulses to the gate lead of rectifier SCR3. It operates in the same fashion and for the same purposes as Phase Controls A and B. It should be understood, however, that in accordance with the established principles of three phase power circuits, there is a phase angle of 120° between each phase and each of the other phases. Hence, on each cycle of the applied voltage the triggering action initiated by Phase B Control will lag 120° behind the triggering action of Phase A, while the triggering action of Phase C Control will lag another 120° behind Phase B.

The starting ramp voltage is also applied to each of the phase controls A, B, and C. As the magnitude of the starting ramp voltage increases, the phase controls will change the firing angles of the corresponding rectifiers in such a manner that the total flow of the current to the load is also increased. When the starting ramp reaches its full voltage each silicon controlled rectifier will be triggered to the 'ON' condition at the very beginning of the corresponding negative half cycle of the supply voltage. Hence, there will be full conduction of current on both half waves of the applied voltage in all three lines, and the motor 10 will be receiving full power.

After full power is applied to the motor, the motor will then reach the maximum speed at which it is capable of driving its load. As the motor continues to operate, the current from the supply lines will pass through the diodes on positive half cycles of the voltage, and through the silicon controlled rectifiers on the negative half cycles.

When it is desired to brake the motor and its load, the Selector Circuit is again actuated (as, for example, by pressing the Brake button). This action will disable the Soft Start Control at the same time the Brake Control sends an 'OFF' signal to Phase B Control and Phase C Control. The rectifiers SCR2 and SCR3 will then no longer be triggered. At the same time the Brake Control generates a brake signal, preferably of fixed magnitude, which is supplied to Phase A Control. The rectifier SCR1 will then be triggered on at a specified point during each negative half cycle of the phase voltage between line L1 and ground.

In order to provide a dynamic braking action for the motor 10 it is also necessary to provide a fourth silicon controlled rectifier SCR4. This device has its anode connected to motor terminal M1, while its cathode is connected to motor terminal M2. The gate lead of rectifier SCR4 is controlled by a signal generated from Brake Control.

During the soft start operation it is essential that rectifier SCR4 remain non-conducting at all times. Therefore, during the soft start operation, the Brake Control does not generate a signal that would trigger SCR4, which accordingly remains non-conducting on a continuous basis.

During dynamic braking, however, the operation is entirely different. Rectifier SCR4 must be triggered 'ON' at all times so that it is continuously conducting. Diode 22 does not carry any current because its return paths are blocked both by rectifier SCR2 and by rectifier SCR3. Diodes 24 and 26 conduct current to the extent that a return path is provided by rectifier SCR1, and this depends upon the firing angle which is established for that rectifier.

In general, the dynamic braking action is achieved in the following manner. Power from two of the three phases is shut off, so that there is no longer a rotating magnetic force field applied to the motor. Power continues to be applied from the third or remaining phase, which in this instance is represented by supply line L1.

This single phase power applies a braking action in a manner which has been known in the prior art. With respect to the voltage which is received on supply line L1, during one half of the cycle current flows through rectifier SCR1. Then during the following half cycle current flows out of the motor leads in an inverse direction and is shorted through the rectifier SCR4 that is located immediately adjacent to the motor. It has been previously known to utilize a free wheeling diode to discharge this inductive kick-back voltage, but in accordance with the present invention that function is accomplished by the rectifier SCR4.

The schematic drawing of FIG. 1, of course, does not indicate all the circuitry that is needed to carry out the functions that have been described. The complete circuitry is shown in FIGS. 6, 7, 8 and 9. Waveforms for the soft start operation are shown in the various parts of FIG. 5 while those for the dynamic braking action are shown in the various parts of FIG. 10.

While no feedback loop from the motor or its load is illustrated, it should be understood that a feedback signal may if desired be used to modify the soft start control signal.

SOFT START OPERATION, IN GENERAL
(FIGS. 1-5)

A brief general explanation of the soft start operation has already been given in connection with FIG. 1. Some additional features of the overall circuit arrangement will now be described.

Each phase control for the Phases A, B, and C includes a series combination of an integrator, a comparator, and a trigger circuit. The integrator senses the voltage on the associated supply line, and from it produces a sawtooth voltage wave which commences afresh with each cycle of the incoming voltage. The comparator circuit has two inputs, one of which receives the sawtooth voltage wave. The other input of the comparator receives the starting ramp voltage from the soft start control circuit. In the presently illustrated embodiment of the invention the sawtooth waves are negative-going while the starting ramp voltage is positive-going. When the level of the sawtooth wave reaches the present magnitude of the starting ramp voltage, the trigger circuit of the phase control is turned on. The trigger circuit then continuously generates high frequency output pulses which are applied to the gate lead of the associated silicon controlled rectifier, turning it on.

It is necessary that the direction of movement of each sawtooth voltage wave be opposite to the direction of movement of the starting voltage ramp. However, the circuitry could if desired be arranged so that the starting voltage ramp increases in a negative direction while the sawtooth waves increase in a positive direction.

Since there is a phase angle of 120° from each phase to the next, the starting time for the sawtooth wave generated by each integrator lags the sawtooth wave of the preceding phase by 120°. Likewise, the times when the rectifiers are turned on are separated by a phase angle of 120°.

While the schematic diagram of FIG. 1 shows both the soft start operation and the dynamic braking operation, it will be understood that both functions do not occur at the same time.

Figure 2:
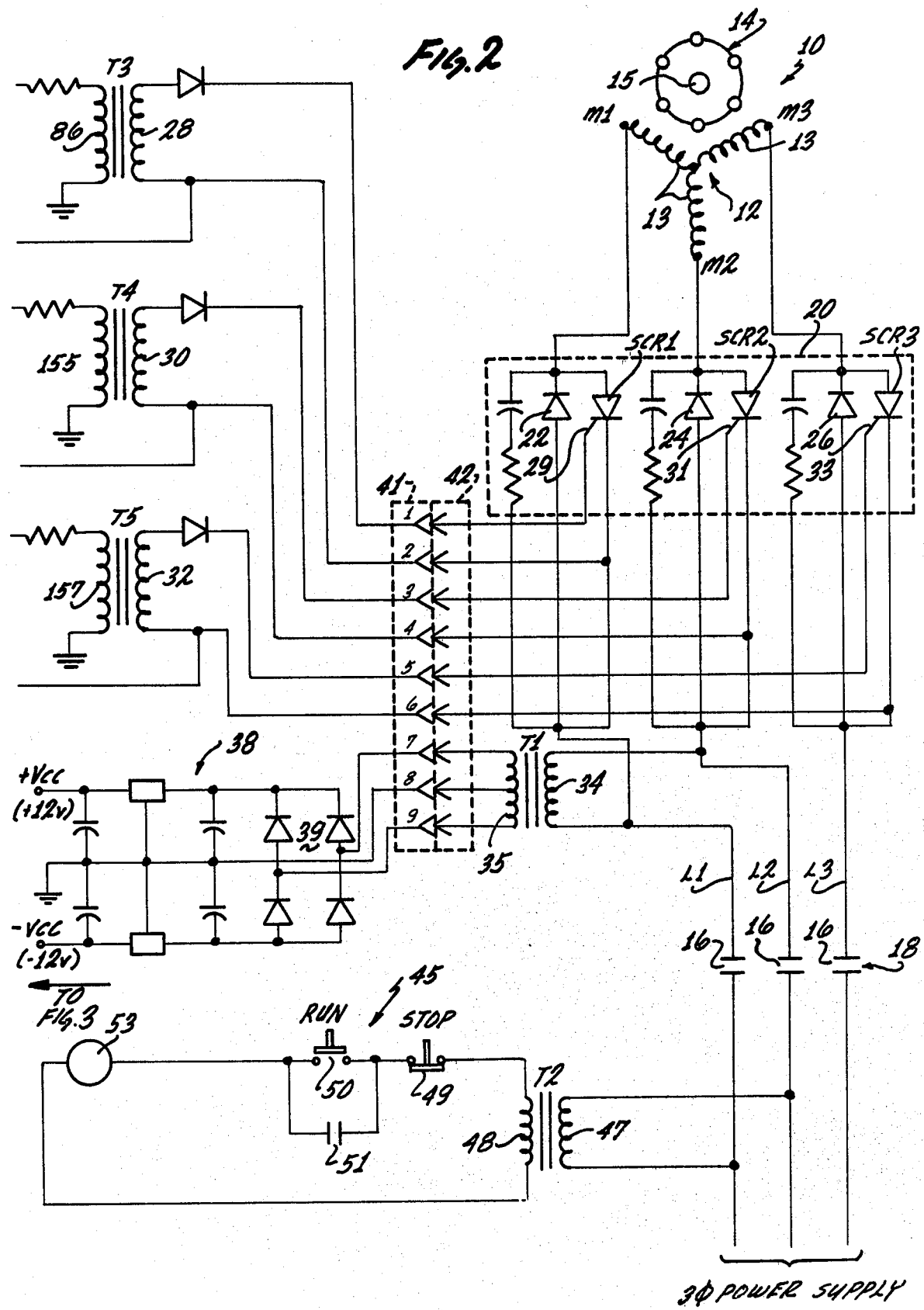
Figure 3:
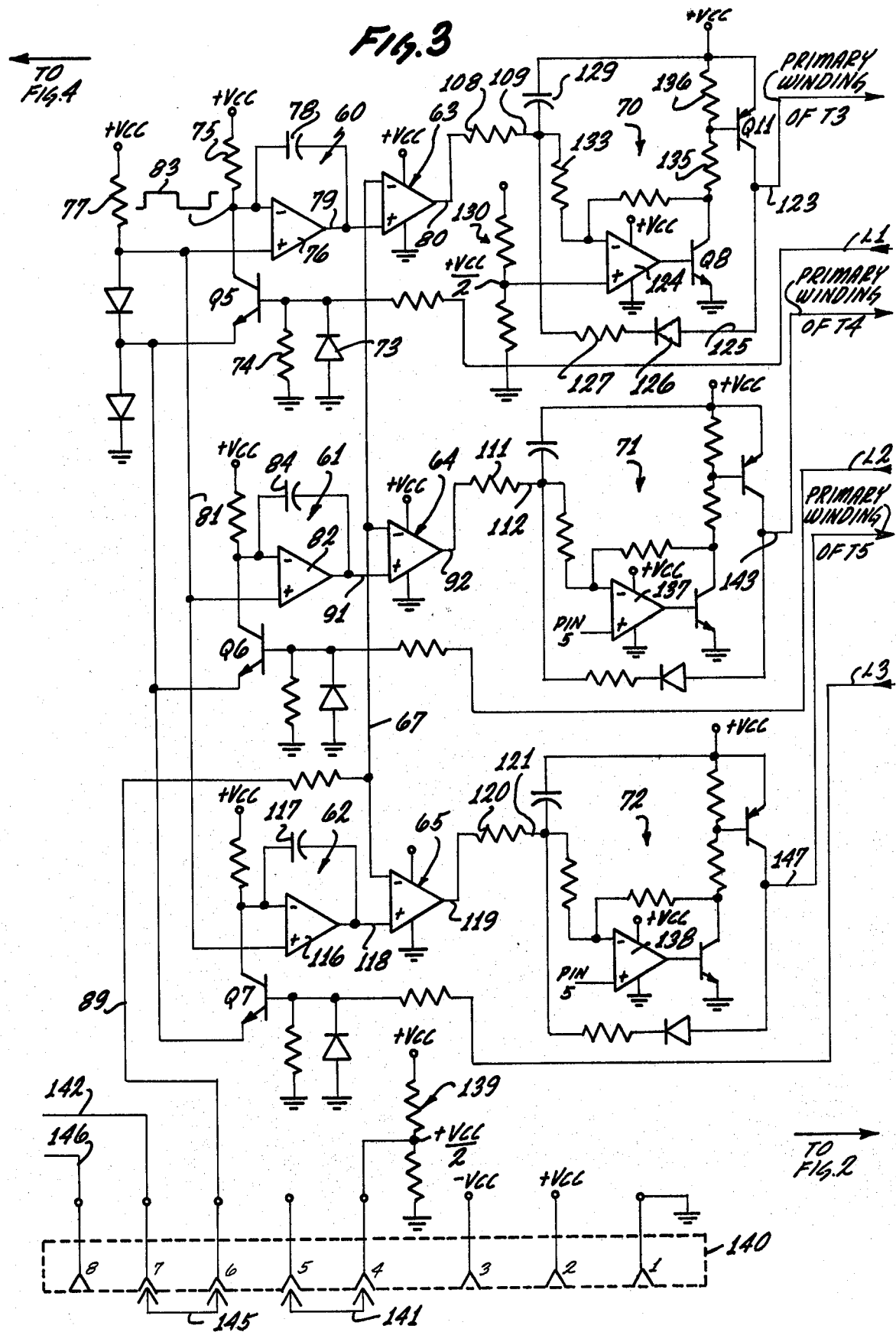
Figure 4:
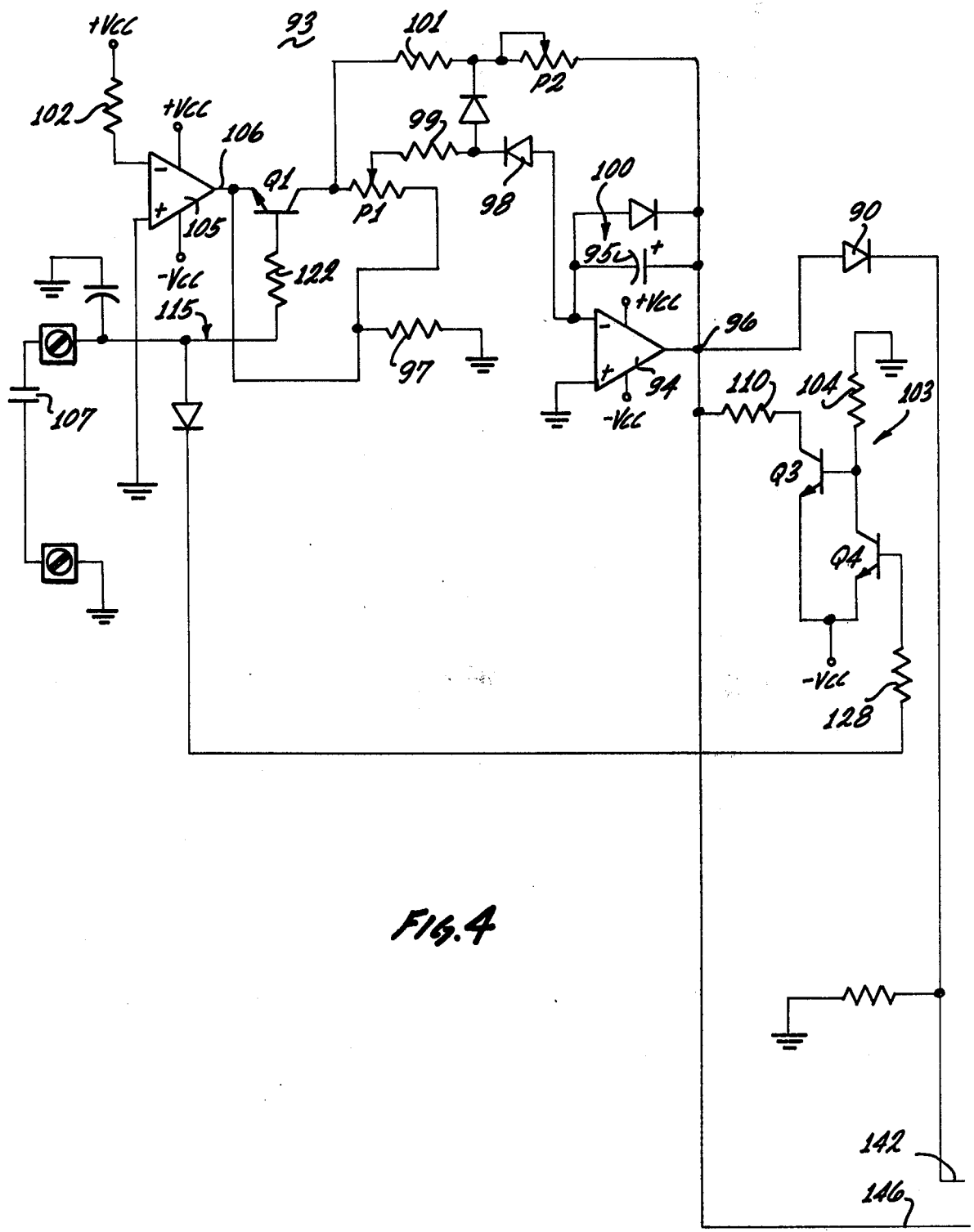
Figure 5:
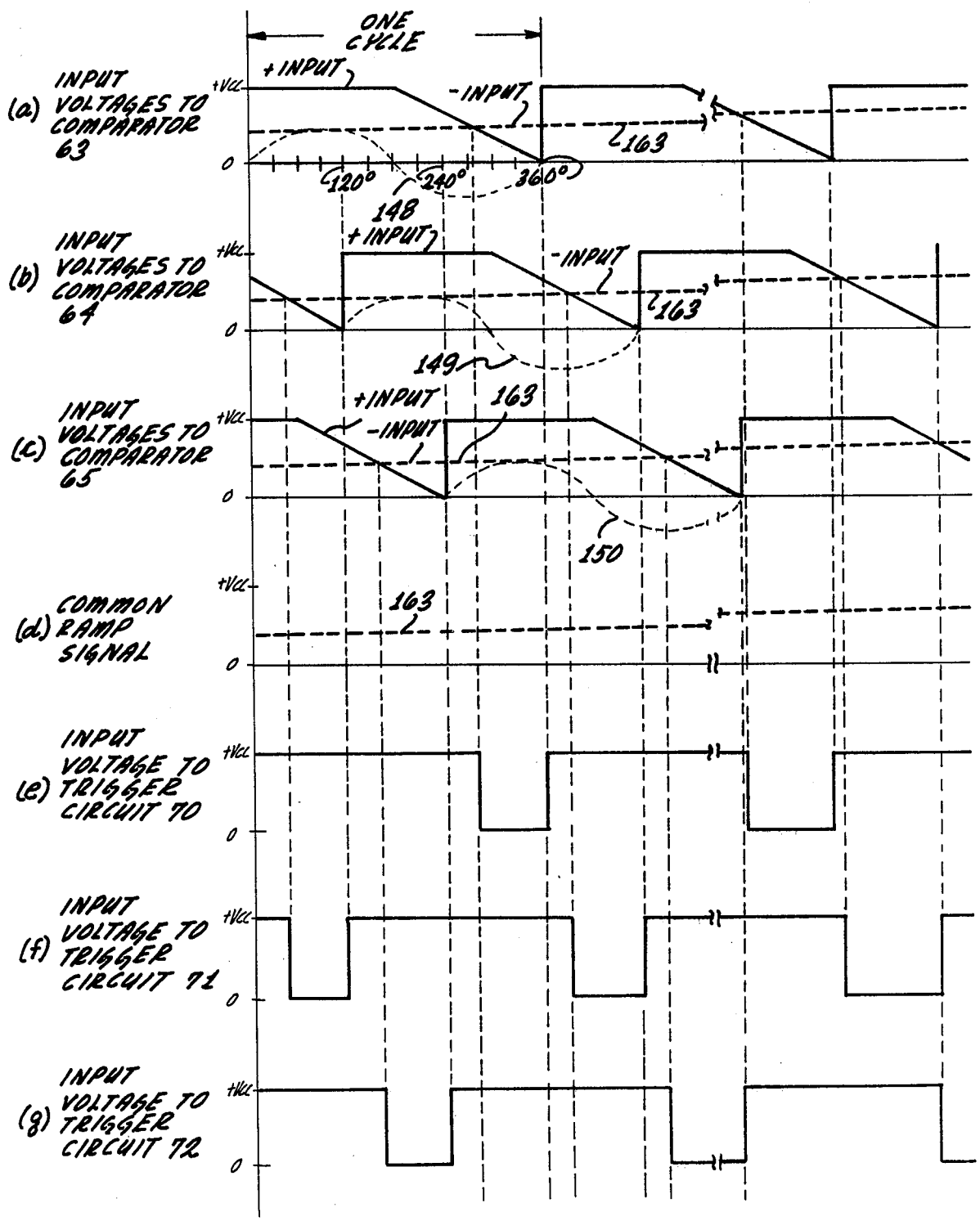

Detailed circuitry for the soft start circuit, not including the braking circuit, is shown in FIGS. 2 through 4, inclusive. The circuitry includes certain connectors and jumpers for convenient attachment of an auxiliary circuit. Complete waveforms of the voltages taking place within the soft start circuit are shown in FIG. 5, parts (a) through (m).

PRELIMINARY OPERATING CONDITIONS FOR THE SOFT START CIRCUIT

As shown in FIG. 2, a three phase induction motor 10 includes a stator 12 provided with three windings 13 connected in a Y configuration between terminals M1, M2, and M3. Motor 10 has a rotor 14 provided with a drive shaft 15.

Also shown in FIG. 2 is a first step-down transformer T1 which has a primary winding 34 connected across two of the supply lines on the inside of the contacts 16 of the motor contactor 18. Connected across secondary winding 35 of transformer T1 is a D.C. voltage circuit 38. Circuit 38 includes a full wave bridge rectifier 39 having its inputs connected across the secondary winding 35 and having its outputs connected with other components in a well known manner to provide regulated D.C. voltages of +12 volts and −12 volts thereon. These D.C. voltages, which are hereinafter referred to as +Vcc and −Vcc are used to power the various control circuits.

Before the motor is started, three phase voltage is present on the supply lines on the input side of contacts 16 of the motor contactor 18. The output sides of the contactors, designated as L1, L2, and L3, do not receive any voltage.

A half-wave voltage controller 20 comprises a silicon controlled rectifier SCR1 and a diode 22 inversely connected in parallel in supply line L1, a silicon controlled rectifier SCR2 and a diode 24 inversely connected in parallel in supply line L2, and a silicon controlled rectifier SCR3 and a diode 26 inversely connected in parallel in supply line L3. It should be noted that each of the silicon controlled rectifiers SCR1, SCR2, and SCR3, is oriented to conduct current from the respective terminals M1, M2, and M3 of the stator windings 13 when its gate is triggered.

At this time the contactor coil 53 is de-energized. The RUN switch is in its normally open position. Contact 107 is in its normally open position. Motor windings M1, M2, and M3 are receiving no voltage, and hence rotor 14 of the motor 10 is at rest.

SELECTOR CIRCUIT OPERATION

FIG. 2 shows a step-down transformer T2 having a winding 47 connected between two lines of the three phase power supply outside the contacts 16 of motor contactor 18. A starter circuit 45 connected across secondary winding 48 of transformer T2 comprises in series a STOP push button 49, RUN push button 50 having a holding contact 51 in parallel therewith, and an energizing coil 53 for the motor contactor 18.

When the RUN push button 50 in the starter circuit 45 is depressed, the resulting current flow energizes coil 53 of the main contactor 18, thus closing the contacts 16 and normally open contact 107. At the same time a holding contact 51 is closed keeping coil 53 energized and will therefore retain contactor 18 in its closed position.

The flow of current in starter circuit 45 also closes contact 107 in the initiating circuit 115 (FIG. 4) of the starting ramp generator 93.

The closing of contact 107 causes the linear ramp signal generator 93 to become operational, thus initiating the generation of the common starting ramp signal 163 which appears on the output 96 of generator 93. This starting ramp signal is applied to the comparators of all of the phase controls by means of circuit connections that will be described subsequently.

When it is desired to stop the motor 10, the operator depresses the STOP push button 49 in the starter circuit 45. This opens up the starter circuit 45, de-energizing coil 53 and causing the contacts 16 of the motor contactor 18 to open. Thus, the three phase power supply is disconnected from both the motor and the various control circuits shown in FIGS. 2 through 4, inclusive. De-energizing coil 53 also opens the contact 107 in the initiating circuit 115 of the linear ramp signal generator 93. It also activates a reset circuit 103 which discharges a capacitor 95 on which the ramp voltage was stored. The motor then continues to rotate or cruise to a stop unless a mechanical brake (not shown) is applied.

GENERATING THE STARTING VOLTAGE RAMP

Referring to FIG. 4, a linear ramp signal generator 93 produces a positive-going starting ramp signal 163 at output terminal 96 (see FIG. 5(d). A selection is provided with respect to the initial magnitude at which the ramp voltage will start. This selection is achieved through a potentiometer P2 which, by setting the initial value of the voltage, also establishes the initial starting torque that will be applied to the motor 10. There is also a potentiometer P1 which provides a selection as to the steepness of the slope of the starting ramp voltage. The ramp generator operates by charging a capacitor 95, and the potentiometer P1 controls the slope of the voltage ramp by adjusting the charging rate of that capacitor.

The linear ramp generator 93 is composed of three separate circuits, all of which are shown in FIG. 4. An initiation circuit 115 is used to initiate the operation. An integrator 100 generates the ramp voltage. Also included is a reset circuit 103 which functions to turn off the ramp when the motor is to be either stopped or braked.

The linear ramp signal generator 93 includes an integrator 100 comprised of an operational amplifier 94 whose internal circuits are connected in a well-known manner to +Vcc and −Vcc. A capacitor 95 connects the output 96 of the operational amplifier 94 to the inverting input thereof. The noninverting input to the operational amplifier 94 is grounded.

The inverting input of the operational amplifier 94 is also connected through a diode 98 and a resistor 99 to the wiper of time potentiometer P1. It should be noted that the series circuit including resistor 97 and the resistor of P1 conducts from ground through transistor Q1 to the output 106 of an operational amplifier 105. Operational amplifier 105 has its noninverting input connected to ground and its inverting input connected through resistor 102 to +Vcc. When so connected the output 106 of operational amplifier 105 is maintained at −Vcc voltage. The output 96 of operational amplifier 94 is further connected through the wiper of potentiometer P2 and a resistor 101 to the collector of transistor Q1.

The linear ramp signal generator 93 further provides an initiating circuit 115 comprised of a normally open contact 107 of the motor contactor 18. The initiating circuit 115 has one end connected to ground and the other end thereof connected through a resistor 122 to the base of the transistor Q1, and through resistor 128 to the base of transistor Q4. The closing of RUN button 50 closes contact 107 in the initiating circuit 115. As a result, transistor Q1 is turned on, and transister Q4 in reset circuit 103 is also turned on causing transistor Q3 to be turned off. This enables the capacitor 95 to start to gradually charge from an initial voltage thereon determined by the setting of the starting torque potentiometer P2. The charging path for capacitor 95 is from +Vcc, output 96, capacitor 95, diode 98, and resistor 99 to the wiper of starting torque potentiometer P1. Thus, the charging time of the capacitor 95 is determined by its value, the value of resistor 99, and the setting of the potentiometer P1.

It should now be clearly understood that the output 96 of operational amplifier 94 is normally at ground and that the starting torque potentiometer P2 is set by the operator to provide an initial voltage thereon. Also, the time potentiometer P1 is set by the operator to determine the time it takes for capacitor 95 to charge to +Vcc or, in other words, to determine the slope of the common positive ramp signal generated on the output 96 of the linear ramp signal generator 93. The charging time for the capacitor 96 may typically be on the order of thirty seconds.

The linear ramp signal generator 93 also includes a reset circuit 103 comprised of n-p-n transistor Q3 and n-p-n transistor Q4. Transistor Q4 has its collector connected through a resistor 104 to ground and its emittor connected to −Vcc. Transistor Q3 has its collector connected through the resister 110 to the output 96 of operational amplifier 94, and its emittor connected to −Vcc. The collector of transistor Q4 is connected to the base of transistor Q3.

It should now be apparent that the reset circuit 103 serves to discharge capacitor 95 and thus reset the output 96 back to ground when the contact 107 in the initiating circuit 115 is opened.

The common positive ramp signal 163 provided by the linear ramp signal generator 93, as shown in FIG. 5(d), is simultaneously supplied by common line 67 to the inverting inputs of each of the comparators 63, 64 and 65.

As a result of the RUN push button being depressed in the starter circuit 45, the contact 107 in the linear ramp signal generator 93 is closed thus initiating the generation of the common positive ramp signal on the output 96 thereof. This common positive ramp signal 163 is applied on line 142 to pin 7 of the female connector 140 and connected via jumper 145 from pin 7 to pin 6 thereof. A line 89 connects pin 6 to the common line 67 which supplies the reference signal to the inverting inputs of each of the comparators 63, 64, and 65 in FIG. 3. In addition, a line 146 connects the output 96 of the linear ramp signal generator 93 to pin 8 of female connector 140.

PHASE CONTROL CIRCUITS

As described in conjunction with FIG. 1, there are separate phase controls A, B, and C for the first, second, and third phases of the supply voltage, respectively. The circuitry for the first or Phase A control will now be described with reference to FIGS. 2 and 3.

Thus as shown at the top of FIG. 3 there is an integrator circuit 60 which drives a comparator circuit 63, the output of which in turn goes to a trigger circuit 70. Integrator 60 operates in response to a sensing of the line voltage on supply line L1. Comparator 63 receives the output signal from integrator 60, and also receives the starting ramp voltage signal 163 that is provided on the line 67, as previously described. The output signal from trigger circuit 70 is then fed to the gate lead 29 of rectifier SCR1.

More specifically, a pulse transformer T3 shown in the upper left hand corner of FIG. 2 has a primary or input winding 86 and a secondary or output winding 28. It is this pulse transformer which conveys the output signal from trigger circuit 70 to the gate lead 29 of SCR1. Thus, one end of secondary winding 28 is connected to the supply line L1 while its other end is connected through a diode to the gate lead 29 of SCR1. Since the first end of winding 28 is connected to supply line L1, a lead is also carried from there (across the upper part of FIG. 3) to an inverter stage Q5 which drives the integrator 60.

The operation of the inverter stage is as follows: The voltage on supply line L1 is fed to the base of n-p-n transistor Q5. A diode 73 and a resistor 74 in parallel connect the base of transistor Q5 to ground and serve to clip the positive peaks of the first phase voltage drawn from supply line L1. This causes transistor Q5 to conduct from +Vcc through resistor 75 to supply a square wave 83 (FIG. 3) on the inverting or (−) input of an operational amplifier 76, which square wave is synchronized with the zero crossings of the first phase voltage. A fixed voltage level produced by conduction from +Vcc through a resistor 77 to ground is provided on the noninverting or (+) input of operational amplifier 76.

A capacitor 78 connects the output 79 of operational amplifier 76 to the inverting input thereof to form the integrator 60 which provides a sawtooth waveform on the output 79, i.e., a waveform having a steady state voltage during the positive half cycle and a negative going sawtooth during the negative half cycle of the first phase voltage on supply line L1.

The sawtooth waveform on output 79 of integrator 60 is applied to the noninverting input of an operational amplifier operating as the comparator 63. The inverting or (−) input of comparator 63 is provided with the common positive ramp signal 163 supplied on common line 67 by ramp signal generator circuit 93 as previously described. The output 80 of the comparator 63 is connected by a resistor 108 to the input 109 of the trigger circuit 70.

Next to be described is the first phase trigger circuit 70 which comprises an input 109, an output 123 an operational amplifier 124, a p-n-p transistor Q11, an n-p-n transistor Q8, and a feedback circuit 125 including a diode 126 and a resistor 127 connected in series. The input 109 is connected by a capacitor 129 to the +Vcc voltage and the output 123 is connected by transistor Q11 to the +Vcc voltage. The input 109 and the output 123 are tied together by the feedback circuit 125. Operational amplifier 124 has its noninverting input connected to a fixed potential of Vcc/2 supplied by a circuit 130 and has its inverting input connected through a limiting resistor 133 to the common junction of capacitor 129 and resistor 127 to which the common junction of the input 109 of trigger circuit 70 is also connected. The output of the operational amplifier 124 is connected to the base of transistor Q8. The collector of transistor Q8 is connected by way of series resistors 135 and 136 to +Vcc. The common junction of resistors 135 and 136 is connected to the base of transister Q11. Output 123 is taken at the collector of Q11.

Output 123 of trigger circuit 70 is connected to one end of the primary winding 86 of pulse transformer T3. The other end of that primary winding is grounded. Thus, pulses generated by trigger circuit 70 are delivered through transformer T3 to the gate lead 29 of SCR1.

When trigger circuit 70 is inoperative, its input 109 is high in potential (+Vcc) and its output 123 is low in potential (ground). Also, the output of its operational amplifier 124 is low in potential such that transistor Q8 and consequently transistor Q11 are turned off. When the input 109 swings to a low potential as a result of a negative going rectangular wave on the output 80 of the comparator 63, the output of operational amplifier 124 swings to a high potential causing transistor Q8 and consequently transistor Q11 to conduct.

This conduction through transistor Q11, diode 126 and resistor 127 raises the potential on the output 123 and also raises the potential on the input 109 of the trigger circuit 70 by charging capacitor 129. This causes the output of operational amplifier 124 to again swing low turning off transistors Q8 and Q11 and again lowering the potential on output 123. The cycle then starts over again with the output of the operational amplifier 124 again swinging to a high potential. The operational amplifier 124 thus oscillates at a rate determined by the values of the capacitor 129 and the resistors 133 and 108 to provide a series of high frequency firing or trigger pulses on output as long as the waveform supplied on the input 109 of the trigger circuit is low in potential. The trigger pulses on the output 123 of the first phase trigger circuit 70 are applied to the primary winding 86 of pulse transformer T3.

In similar fashion the Phase B control includes an integrator 61, a comparator 64, and a trigger circuit 71. The input signal for integrator 61 is received from supply line L2 through the inverter stage Q6. Comparator 64 receives the output signal from integrator 61 as well as the reference signal 163 on the common line 67. The output of comparator 64 drives the trigger circuit 71, whose output in turn passes through pulse transformer T4 in order to trigger the gate lead 31 of SCR2. Although the component parts of the circuits have different numbers, the structure and operation of the circuits 61, 64, and 71 correspond to those of circuits 60, 63, and 70, respectively. in other words, the Phase B control is constructed and operates in exactly the same way as the Phase A control, except that it takes its input signal from line L2 rather than L1 and provides its output signal for controlling SCR2 rather than SCR1.

Likewise, in Phase C control there is an integrator 62, a comparator 65, and a trigger circuit 72 which are shown near the bottom of FIG. 3. These circuits are also constructed and operate in the same fashion as their counterparts for Phase A and B. The Phase C control receives its input signal from supply line L3, and controls the firing of SCR3 by means of pulses supplied through pulse transformer T5 to gate lead 33.

It will therefore be seen that each of the three phase control circuits is constructed and operates in the same fashion, but each is tied in with a separate one of the supply lines, and hence, they operate at phase intervals of 120°. The operation will be better understood in conjunction with a description of the wave forms as shown in FIG. 5(a) through (m).

The schematic wiring diagrams of the trigger circuits 71 and 72 are identical to the trigger circuit 70 with the exception that whereas the trigger circuit 70 is provided with its own circuit 130 for providing Vcc/2 to the noninverting input of its operational amplifier 124, the trigger circuits 71 and 72 have the noninverting inputs of their respective operational amplifiers 137 and 138 connected to pin 5 of a female connector 140. A removable jumper 141 then connects pin 5 to pin 4 of connector 140 which latter pin has connected thereto a circuit 139 which supplies Vcc/2. The trigger pulses provided on the output 143 of the second phase trigger circuit 71 are applied to the primary winding 155 of pulse transformer T4, and the trigger pulses on the output 147 of the third phase trigger circuit 72 are applied to the primary winding 157 of pulse transformer T5.

WAVEFORMS FOR SOFT START OPERATION

Reference is now made to the waveforms in FIGS. 5(a) through 5(m), inclusive, comprising two sheets of drawings.

FIGS. 5(a), 5(b), and 5(c) show the waveforms on the inverting and noninverting inputs to the respective comparators 63, 64, and 65 of the first, second and third phase control circuits. The first, second and third phase voltages are indicated, for reference purposes only, by dashed waveforms 148, 149, and 150 in FIGS. 5(a), 5(b), and 5(c). Thus, as noted, the sawtooth waveform provided on the noninverting input of the second phase comparator 64 is offset 120 degrees from the sawtooth waveform provided on the noninverting input of the first phase comparator 63.

Any time that the waveform on the inverting input of one of the comparators 63, 64, and 65 is higher in potential than the waveform on the noninverting input thereof, the output thereof switches to ground. At other times, the output of each of the comparators is at +Vcc. FIGS. 5(e), 5(f), and 5(g) show the outputs of the comparators 63, 64, and 65 as applied to the inputs of the triggers 70, 71, and 72. The low potential on the input of each of the trigger circuits, as previously described, causes each to emit high frequency pulses, as indicated by waveforms 5(h), 5(i), and 5(j). These trigger pulses are supplied via the pulse transformers T3, T4, and T5 to turn on the silicon controlled rectifiers SCR1, SCR2, and SCR3 in the respective supply lines L1, L2, and L3.

It should be noted from FIGS. 5(k), 5(l), and 5(m) that, as a result of the trigger pulses provided for each phase voltage, full voltage is supplied on the positive half cycle thereof and a portion 179 of the voltage is supplied on each negative half cycle thereof, the portion 179 gradually increasing as the common positive ramp signal 163 reaches +Vcc. It should now be clearly understood that when the common positive ramp signal 163 reaches +Vcc full voltage is applied to the motor 10.

OPERATION AT FULL MOTOR SPEED

As previously explained, upon pushing the 'RUN' button, the Soft Start Control then operates to cause a gradually increasing portion of the power to be applied. At the end of the starting voltage ramp, when capacitor 95 is fully charged to the power supply voltage +Vcc, the rectifiers SCR1 and SCR2, and SCR3 are then continuously gated on during the negative half cycle of supply voltage applied on their respective supply lines. Thus, full voltage is applied to the motor 10, and it will therefore eventually attain its maximum operating speed. The exact operating speed attained will, of course, depend upon the size of the load driven by the motor, as well as other factors. No other actions are needed in the Selector Circuit until such time as it is desired to either stop or brake the motor.

PACKAGING THE CIRCUITRY FOR ADD-ON BRAKE ATTACHMENT for add-on Brake Attachment The present invention as illustrated in FIG. 1 may, of course, be constructed and arranged in many different alternative fashions, each of which would be effective for achieving the desired result. The detailed circuitry shown in FIGS. 2 through 4, inclusive, includes the voltage controller and the soft start control, but not the brake control. However, the circuitry of FIGS. 2 through 4 is packaged in such a way that an auxiliary circuit, needed in order to perform the braking function, may be conveniently attached to it.

More specifically, the use of soft start control circuits has been standard in the motor control industry for a number of years. The circuit of FIGS. 2 through 4 is believed to be novel as to both its structure and its mode of operation, but the end result which it performs has previously been available to the industry in other soft start control circuits.

It is convenient to refer to the circuitry of FIGS. 2 through 4 as the "main printed circuit board" or "main P.C. board." Actually there are a number of components which are not mounted on the printed circuit board, and these include the Selector Circuit motor contactor 18, the silicon controlled rectifiers, and transformer T1. Thus, the main P.C. board provides the remaining circuitry of FIGS. 2 through 4, and these two portions of the circuitry are connected together by connectors 41 and 42.

Figure 6:
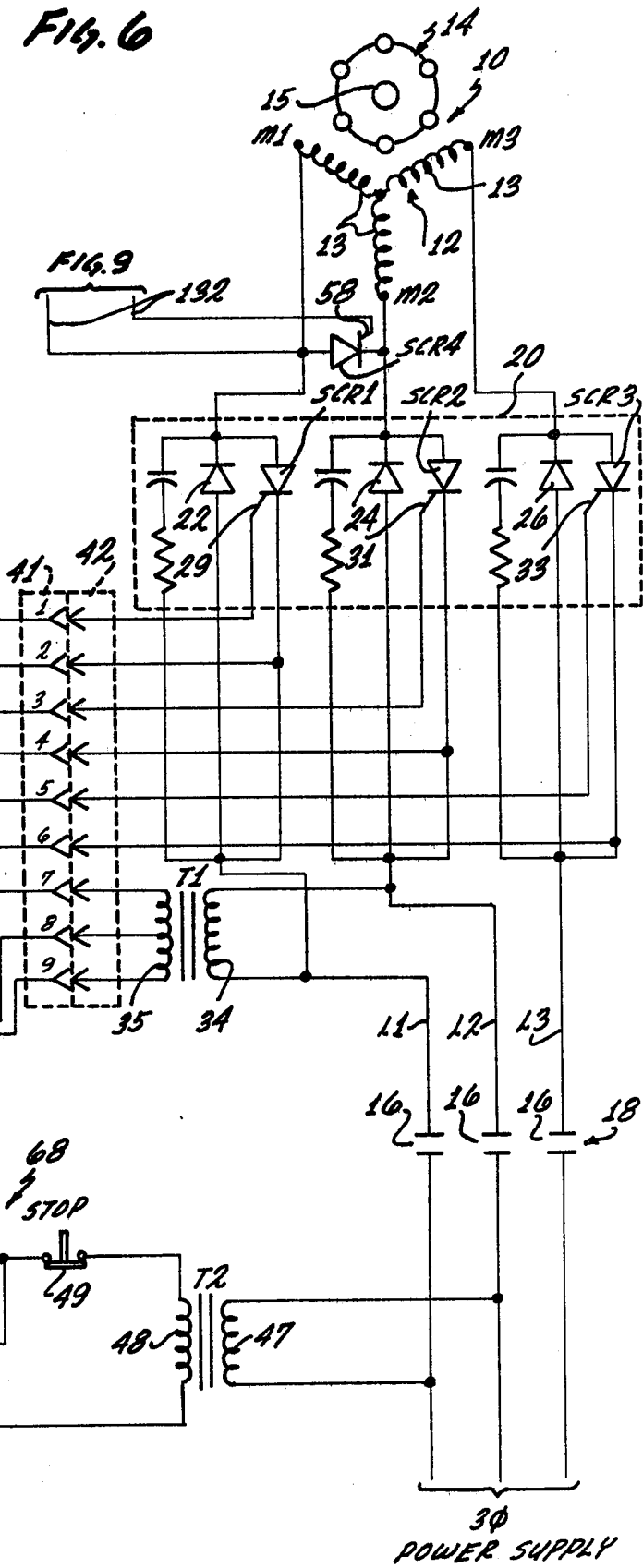
Figure 7:
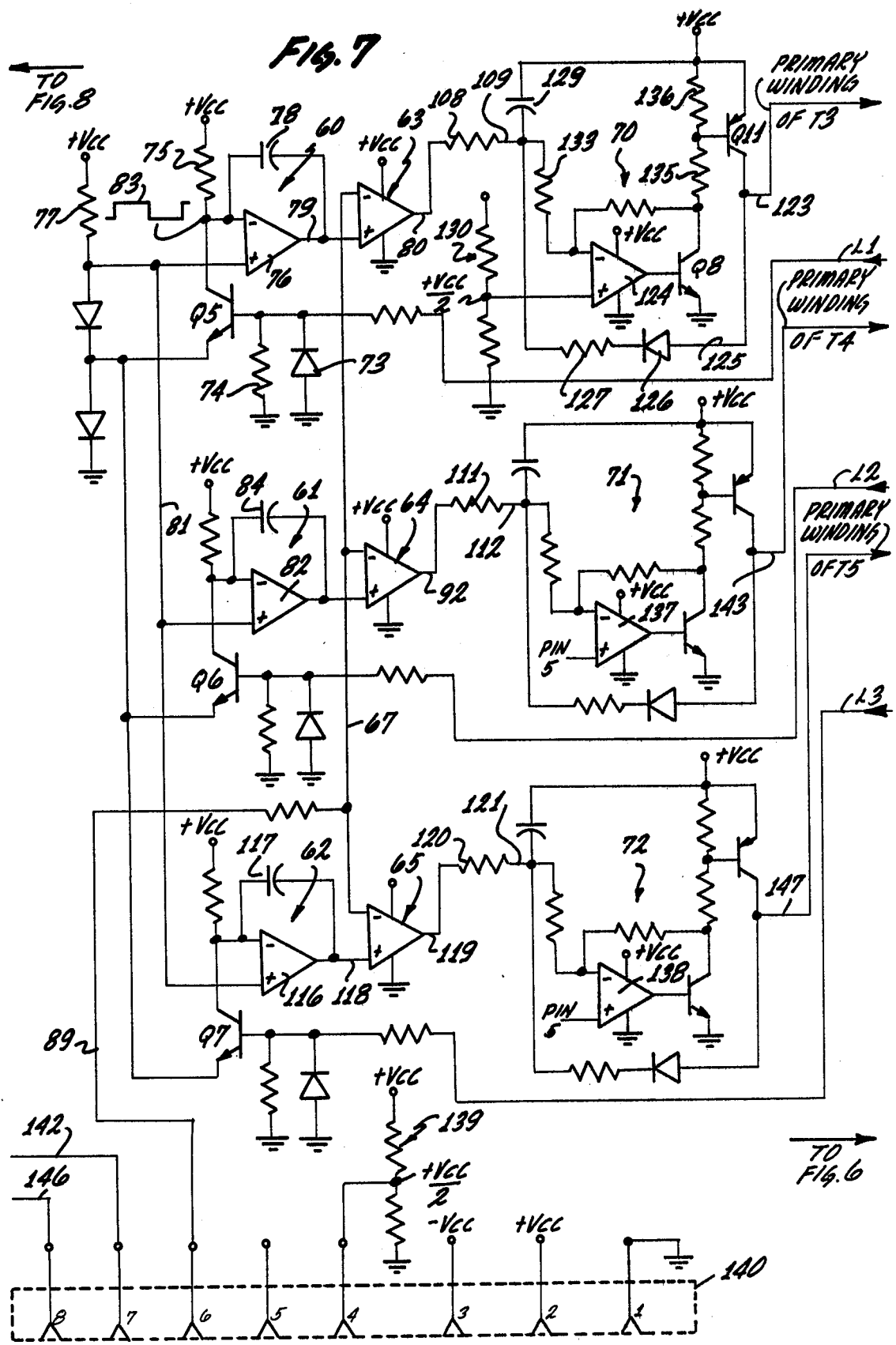
Figure 8:
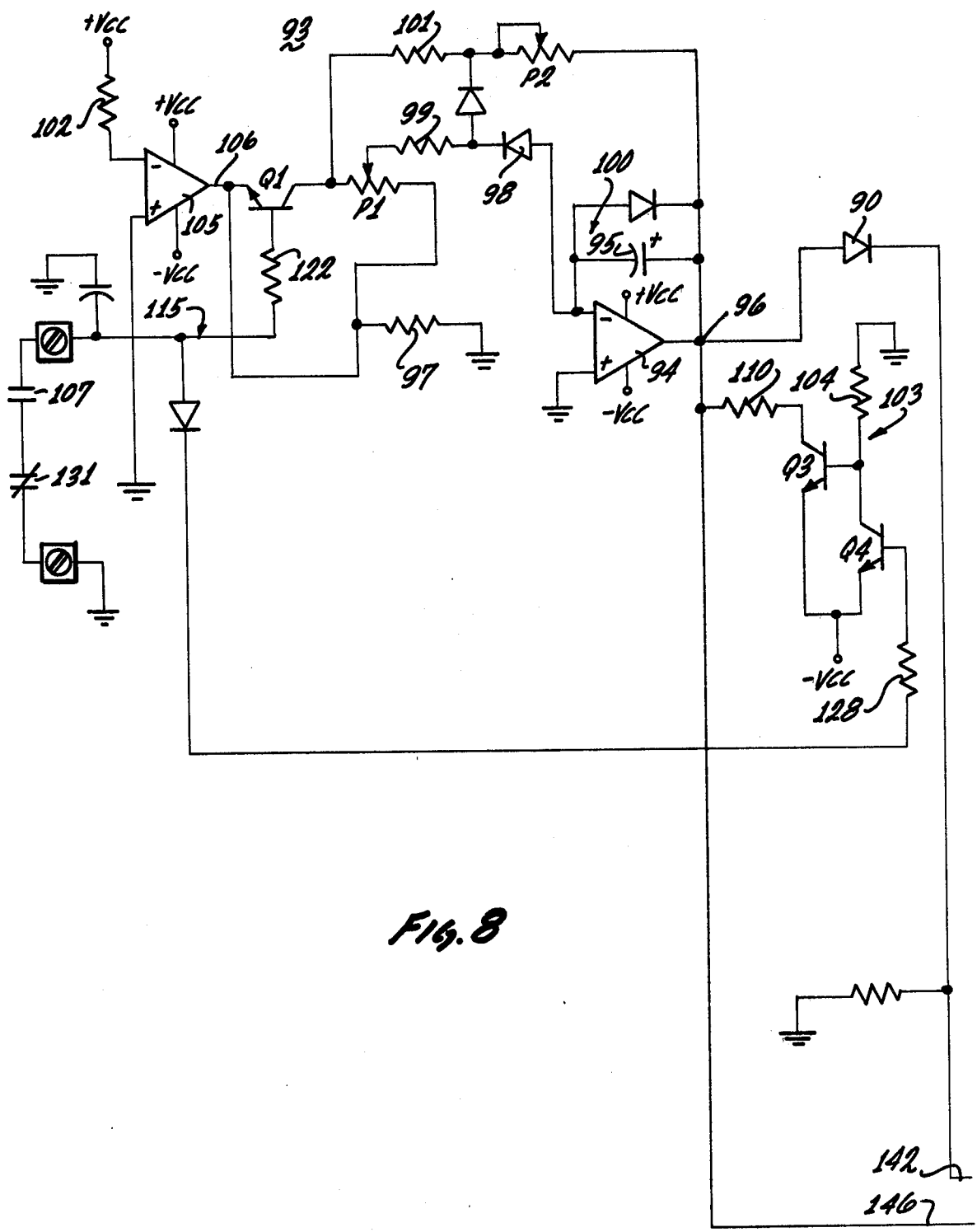

The soft start control circuitry of FIGS. 2 through 4 is especially adapted for the attachment of an auxiliary circuit thereto, such that the entire circuit combination will then perform both the soft start and the braking functions as illustrated and described in conjunction with FIG. 1. Customers who want only the soft start control can, therefore, purchase the equipment as illustrated in the circuitry of FIGS. 2 through 4. Then the circuit can be subsequently modified to include the braking function, if that is desired. When it is desired to add the braking function, some additional components must be added to the circuits Of FIGS. 2 through 4. The circuits as thus modified are shown in FIGS. 6 through 8. Then an auxiliary P.C. board containing the circuitry of FIG. 9 is attached to the circuits of FIGS. 6 through 8. A complete operating system as described in conjunction with FIG. 1 is then achieved.

One of the component parts that must be added to the circuits of FIGS. 2 through 4 is a silicon controlled rectifier SCR4. This is shown in FIG. 6. It is connected in the circuit in the same relative position as previously illustrated and described in conjunction with FIG. 1. The control circuit for SCR4 is located on the auxiliary P.C. board, and a separate pair of connectors is provided for making that circuit connection.

It is also necessary to remove the jumpers 141 and 145 from the female connector 140.

Modification is also required in the Selector Circuit. Thus, FIG. 6 shows a modified form of the starter circuit 45, but a part of the complete Selector Circuit is now a triac 151 that is located on the auxiliary P.C. board. Connections are also provided for incorporating it into the main circuit. Another part of the modification of the Selector Circuit is the addition of a relay contact 131 which is inserted in the initiating circuit 115 associated with the starting ramp generator 93. Specifically, relay contact 131 has a normally closed set of contacts, and is connected in series between relay contact 107 and ground.

The auxiliary P.C. board is attached to the main board in the following manner. Connector 144 is attached to connector 140. Line 146, which was previously unattached, now becomes part of the active circuitry. The connector carrying lines 132 of FIG. 6 and the connector carrying lines 132 of FIG. 9 are connected together, thus completing the control circuit for SCR4. A connector carrying lines 56 of FIG. 9 is also coupled to a connector carrying lines 56 of FIG. 6, thus completing the modified Selector Circuit.

In FIG. 6 the modified Selector Circuit is identified by numeral 68 in order to differentiate it from the original circuit 45 as shown in FIG. 2. Holding coil 51 is still in parallel with RUN button 50, but between those two devices and the relay coil 53 the line is opened to provide a pair of leads 56. As shown in FIG. 9, the leads 56 are there connected across a triac 151 which forms part of a solid state relay 152.

Also in the circuit of FIG. 6, a BRAKE button 55 is connected in series with an energizing coil 59. A holding contact 57 is connected in parallel with the BRAKE button. This entire series combination is then connected in parallel with the energizing coil 53 and the open leads 56. Energizing coil 59 is an energizing coil for the brake circuit, and contact 57 is a holding contact for the BRAKE button 55. The STOP button 49 and transformer T2 occupy the same circuit arrangement as FIG. 2.

As pointed out in connection with FIG. 1, the start control circuit and the brake control circuit function alternately, rather than at the same time. Therefore, when the auxiliary P.C. board is connected to the main P.C. board, some of the circuitry will function only during braking, and other portions of the circuit will be in operation at all times.

Because of the packaging arrangement, however, one portion of the circuit on the main P.C. board is rendered completely inoperative. This is the power supply circuit 139 which provides voltage plus Vcc/2 for the trigger circuits 71 and 72. An equivalent circuit 44 is provided on the auxiliary P.C. board, as shown in FIG. 9. This circuit includes resistors 158 and 159 and supplies voltage +Vcc/2 during conduction of transistor Q18. During the quiescent state of transistor Q18, the +Vcc/2 voltage is not supplied to trigger circuits 71 and 72 thus rendering the associated phase controls inoperative.

THEORY OF BRAKE OPERATION

The general concept of dynamic braking of a three phase induction motor has been known and used in the prior art. When the motor is running it is driven by three phase alternating current power, which generates a rotating magnetic field that in turn causes the motor to rotate. When it is desired to brake the motor, this power is shut off. Power is then supplied from only a single phase to the motor windings, but it is direct current power rather than alternating current power. This direct current power produces a non-rotating magnetic field that in turn opposes the continued rotation of the motor.

In the prior art the running circuit for the motor and the dynamic braking circuit for the same motor have been two entirely separate circuits. The dynamic braking circuit supplies current pulses from only a single phase of the supply voltage. At the conclusion of each pulse the inductive action of the motor windings produces a voltage in the inverse direction, known as an inductive kickback voltage. In order to dissipate that voltage a diode is connected between the two motor terminals that receive the braking signal. This diode is known in the art as a free-wheeling diode.

According to the present invention the silicon controlled rectifier SCR4 is utilized in place of a free-wheeling diode. By controlling SCR4 in an appropriate manner it is then possible to combine the running circuit and the braking circuit into a single entity. During the soft start operation, and also during the running of the motor, the silicon controlled rectifier SCR4 is kept at all times in a non-conducting state so that it is effectively an open circuit. But during dynamic braking, SCR4 is continuously triggered so that it can absorb the inductive kickback each time it occurs.

BRAKE CIRCUITRY AND WAVEFORMS
(FIGS. 6–10)

The auxiliary P.C. board includes the circuitry shown in FIG. 9. It is attached to the main P.C. board in order to provide a complete operating system in accordance with FIG. 1.

There are several switching steps which must be accomplished in the proper sequence when the motor operation is being changed from RUN to BRAKE. Part of the circuitry to accomplish that purpose is provided in FIG. 9, but some of the circuitry in FIGS. 6 and 8 is also used for that purpose.

The actual braking operation is initiated when a brake timer 154 is turned on. The timing period for this timer is in the range of about 1 to about 12 seconds, as selected by the setting of a timing potentiometer P4. The turning on of timer 154 causes Phase Controls B and C (trigger oscillators 71 and 72 of FIG. 7) to be turned off. A second function accomplished by turning on the brake timer is that operating power is supplied to a trigger circuit 164, which in turn continuously triggers SCR4 so that it is able to conduct at all times. A third function produced by the operation of the brake timer is that it causes a brake torque signal to be generated on line 85 from which it is supplied along line 67 to comparator 63 in the Phase A control circuit. This causes SCR1 to be made conductive during an appropriate portion of each voltage cycle.

When the braking action is completed, another group of switching steps must be accomplished in appropriate sequence in order to return the motor and its power circuit to the proper "at rest" condition. This switching sequence is accomplished under the control of a timer 169 included in the circuit of FIG. 9. The operation of timer 169 is initiated when the brake timer 154 turns off.

More specifically, the plugging in of the auxiliary P.C. board provides a ground connection on pin 1 of the connector 144. It also provides operating power for the control circuits on pins 2 and 3. The operator must select a setting for potentiometer P4 that will determine the duration of the brake timer. The operator also selects a setting of the torque potentiometer P3 that will determine the magnitude of the braking torque to be applied to the motor.

When the BRAKE button 55 (FIG. 6) is pushed, the braking action is not immediately initiated. A sequence of switching steps must occur first. Pushing brake button 55 causes coil 59 to be energized, which in turn opens contact 131 in the initiating circuit 115 (FIG. 8) of the Soft Start Control circuit. As a result, reset circuit 103 is actuated, thus turning off ramp signal generator 100 by discharging the storage capacitor 95. A low voltage level is then supplied by way of line 146 and pin 8 of the connectors 140, 144 to the auxiliary P.C. board. A further timing delay takes place, however, as determined by the time constant t2 provided by a resistor 174 in series with a capacitor 175. This timing circuit is inserted between switching stages provided by transistor Q15 and transistor Q16. Its purpose is to prevent any premature initiation of the timing cycle of the brake timer 154. In the circuit of the brake timer, a capacitor 66 is charged through resistor 69 and the potentiometer P4. In an associated enabling circuit including transistor Q24, a capacitor 178 is provided in order to insert a time delay before the operation commences, so that initiation of the brake timing cycle cannot be started merely by connecting D.C. power to the auxiliary P.C. board.

Thus as shown on FIG. 9, pin 8 of the connector 144 is connected to the base of n-p-n transistor Q15. The emitter of transistor Q15 is grounded and its collector is connected through resistor 173 to +Vcc. The collector of Q15 is further connected through resistor 174 to the base of n-p-n transistor Q16. Transistor Q16 provides for connecting +Vcc to the input 153 of timer 154.

The timer 154 is an integrated circuit such as marketed by the National Semiconductor Company under number LM3905.The timer 154, the basic circuit of which is indicated in block form, further includes the potentiometer P4 connected in series with capacitor 66 and resistor 69 to ground. The output 156 of the timer 154 is at a low potential level when the timer 154 is off.

In order to prevent timer 154 from being inadvertently turned on when +Vcc is first made available to the control circuits, a delay circuit 178 is provided on the base of transistor Q24. The collector of transistor Q24 is connected to the common junction of capacitor 66 and resistor 69. The delay circuit 178 delays the turning on of transistor Q24 and therefore temporarily holds the common junction of capacitor 66 and resistor 69 at a high potential such that capacitor 66 cannot start to charge through the potentometer P4 at this time.

Thus, it is only after the BRAKE button has been pushed, and contact 131 opens, that the circuits of FIG. 9 operate to effect the conduction of transistor Q16, and thereby supply +Vcc voltage to the input 153 of timer 154. After the delays as mentioned above, timer 154 is turned on, causing its output 156 to immediately switch to a high potential and remain at that high potential for the length of time required for capacitor 66 to charge up to two-thirds of the +Vcc voltage. As previously explained, that time period is adjusted by the setting of P4.

The high potential on output 156 continues to exist as long as the brake timer is on. This potential is applied through a resistor 176 to the base of n-p-n transistor Q17 after a delay of t3 which is provided by resistor 176 and capacitor 177. The collector of Q17 is connected through a resistor 158 to +Vcc. When the transistor 60 turns on, the potential at its collector goes from a high level to a low level. This point in the circuit, the collector of transistor Q17, is designated for convenient reference as point "x."

When Q17 is off, Q18 is on, and resistors 158 and 159 form voltage divider to provide a voltage +Vcc/2 to pins 5 of operational amplifiers 137 and 138 (FIG. 7) for the soft start operation.

Several different things happen when the potential at point "x" drops to the low level. Point "x" is connected through pin 5 to trigger circuits 71 and 72 of FIG. 7, and the low level of voltage at point "x" turns these triggers off. Point "x" is also connected through a transistor Q18 to a trigger oscillator 172, and is effective for turning on the trigger oscillator when the voltage level at "x" drops low, thus continuously triggering SCR4 so that it is able to conduct at all times.

More specifically, a resistor 159 is connected between point "x" and the base of transistor Q18, which is of the n-p-n type. The emitter of Q18 is grounded, and its collector is connected through a resistor 161 to the power supply voltage +Vcc. A low potential at point "x" grounds the base of transistor Q18, turning it off. A resistor 162 is connected between the collector of Q18 and ground. Resistors 161 and 162 therefore form a voltage divider, and they are made of equal value so that when Q18 is off, the voltage level at its collector is +Vcc/2. The collector of Q18 is also connected to the non-inverting input of oscillating operational amplifier 172 of the trigger circuit 164. Trigger circuit 164 is similar in its structure and operation to the trigger circuits 70, 71, and 72 which were previously described. Unlike the previous trigger circuits, however, this trigger circuit generates a train of pulses continuously throughout the braking cycle. The output is supplied to primary winding 129 of pulse transformer T6, whose secondary is connected by the lines 132 across the gate lead 58 of SCR4, as shown in FIG. 6. The turning on of trigger circuit 164 causes trigger pulses to be applied to the gate lead of SCR4, and starts the braking cycle. See FIG. 10.

Point "x" is also connected to n-p-n transistor Q19, a switching stage that controls the operation of n-p-n transistor Q20. When point "x" drops to its low potential, Q19 is turned off and Q20 is turned on. This causes current to be conducted from +Vcc through Q20 and potentiometer P3 to ground. The wiper of potentiometer P3 is connected to an output line 85 which in turn is connected to both pins 6 and 7 of the connectors 144, 140. From pin 6 the brake voltage is carried on line 89 to the inverting input of comparator 63 (FIG. 7).

During the braking mode, jumper 88 which connects pins 6 and 7 of the male connector 144 to each other serves no useful purpose. However, the same circuit must operate properly for performing the soft start control, during that mode of operation. Hence, jumper 88 of FIG. 9 is simply a replacement for jumper 145 of FIG. 3.

Reference is now made to FIG. 10 showing waveforms that exist in the circuits of FIGS. 6 through 9 during the braking operation.

In the present description a phase voltage is defined as the voltage from one of the supply lines to a common ground reference point. Thus, the first phase voltage is that which exists between line L1 and ground, while the second phase voltage is that which exists between line L2 and ground. As is well known, there is a phase lag of 120° between each of these phase voltages and the succeeding one.

For clarity of understanding it must be pointed out that the line to line voltages are not identical to any of the phase voltages. Thus, the voltage between supply lines L1 and L2 lags the first phase voltage by 30°; the voltage between lines L2 and L3 lags the second phase voltage by 30°; and the voltage between lines L3 and L1 lags the third phase voltage by 30°. This relationship is of course well known.

In accordance with the present invention, the dynamic braking function is controlled by the same Phase A Control as is used during the soft start operation. Each of the phase controls is responsive to the associated phase voltage, rather than to a voltage between supply lines. Thus the integrator circuit 60 of Phase A Control is actuated by the voltage existing between supply line L1 and a common ground for all phases of the control circuitry. As shown in FIGS. 2 and 3 (and also in FIG. 7 and 8) line L1 is connected to the base of transistor Q5 for controlling the operation of integrator circuit 60.

But in the dynamic braking operation the phase voltages as such are not applied to the motor 10. Rather, it is the voltages between supply lines that are applied to motor terminals M1 and M2, M2 and M3, and M3, and M1. Hence, while Phase A Control is responsive to the first phase voltage, it is only line-to-line voltages that are applied to the silicon controlled rectifiers.

In the dynamic braking circuit, as shown in FIG. 6, pulses of D. C. current are supplied from line L2 and L3 through diode 24 and diode 26 to the motor windings back through SCR1 to L1. SCR1 is selectively triggered on by the Phase A Control. There are two parallel paths through which the current carried by SCR1 may flow. Therefore, in determining when SCR1 will conduct, there are two of the line voltages that are pertinent. One of these is the line voltage between M1 and M2. The other is the voltage between M1 and M3, which is the inverse of the L3 to L1 line-to-line voltage, and hence 180° out of phase with it.

Turning now to the waveforms as shown in FIG. 10, waveform (a) shows the first phase voltage, i. e. the voltage between line L1 and ground. Waveform (b) shows the line voltage between lines L1 and L2, which lags the first phase voltage by 30°. Waveform (f) the braking voltage across terminals M1–M2, is the same as the L1–L2 voltage, but portions are shown in dotted lines indicating that the voltage does not actually reach the motor terminal because the silicon controlled rectifier SCR1 is then shut off.

In waveform (g) the braking voltage across motor terminals M1–M3 is shown. This voltage lags the M1–M2 voltage by 60°. Again, portions of this voltage wave are shown in dotted lines because SCR1 is shut off and no other pathway exists for current flow to the motor windings.

The pushing of the BRAKE button can occur at any point in the first phase voltage cycle. As shown in FIG. 10(a) a point 160 is arbitrarily selected. At the next zero line crossing of the phase voltage the integrator 60 of Phase A Control commences operation, resulting in a negative sawtooth wave applied to one input of comparator 63 as shown in FIG. 10(c). Also shown in FIG. 10(c) is the braking voltage, shown as a horizontal dotted line. The sawtooth wave is applied to +INPUT of comparator 63 while the braking voltage is applied to −INPUT of comparator 63. When the sawtooth voltage falls below the level of the braking voltage, a negative going rectangular pulse as shown in FIG. 10(d) is applied to trigger circuit 70. This pulse turn causes the trigger circuit to oscilate, generating output pulses during the remainder of the negative half cycle of the first phase voltage, as shown in FIG. 10(e).

The short train of trigger pulses as shown in FIG. 10(e) turns on SCR1. But cessation of those pulses does not turn the silicon controlled rectifier off. It will continue to conduct as long as the voltage applied on its anode is positive to that applied on its cathode. The M1–M2 voltage as shown in FIG. 10(f) continues negative during the interval designated by reference numeral 165, and SCR1 conducts during that period, since its polarity is inverted in the supply line L1. That is, its anode is connected to motor terminal M1 while its cathode is connected to the incoming supply line.

But SCR1 does not cease to conduct when the M1–M2 voltage crosses the zero line. The reason is that another voltage is also supplied at the same time through the second or parallel M1–M3 path. And as shown in FIG. 10(g), that voltage permits SCR1 to continue conducting for a longer period of time. Specifically, current conduction through SCR1 under the influence of the M1–M3 voltage is indicated in solid lines by the area 167.

When the M1–M2 voltage reaches the zero crossing at the end of conducting period 165, an inductive kickback voltage is generated by the motor windings. This voltage is shown in dotted lines by an area designated 166. That inductive kickback is absorbed by SCR4, since it is kept continuously triggered to a conductive state.

When the M1–M3 voltage reaches the zero crossing, SCR1 then becomes back-biased and will no longer conduct. Immediately following that point is a current area indicated in solid lines 182. This is a current generated by inductive kickback of the windings between terminals M1 and M3. Since SCR1 is now cut off the inductive kickback current must flow entirely through SCR4.

It will be noted that the kickback current 182 is substantially smaller than the negative current pulse 167. Thus, there is a net direct current through the motor windings in one direction, which creates the magnetic field that is desired for braking purposes.

When timer 154 turns off at the end of its cycle, the low voltage on its output 156 turns off transistor Q17 and raises the voltage at point "x" to +Vcc/2. Q18 is now turned on thus removing +Vcc/2 voltage from trigger circuit 164 rendering it inoperable. Point "x" is connected by line 168 to the input of a second timer 169 which is an integrated circuit identical to that used for timer 154 but wired differently. Timer 169 is therefore turned on and its output 170 is switched to a low potential which turns off transistor Q23 after a delay provided by resistance-capacitance time constant circuit 171 and opens the triac 151 in solid state relay 152. This in turn opens the starter circuit 68 of FIG. 6, and deenergizes the holding relay 51 so that motor contactor 18 opens, thereby opening the contact 16 and discontinuing the supply of three phase power on the supply lines L1, L2, and L3. It should be noted that a delay circuit 171 on the base of transistor Q23 delays the turning off of the transistor Q23 so that the solid state relay 152 will not open until after the silicon controlled rectifiers SCR1 and SCR4 have been turned off. This assures that the opening of the motor contactor 18 occurs during minimum current flow through its contact 16 thereby avoiding or minimizing arcing.

ELIMINATING CIRCUIT DUPLICATION

In accordance with the present invention the same phase controls are utilized for controlling the silicon controlled rectifier during both the soft start operation and the dynamic braking operation. The phase controls in accordance with the present invention have been specially devised in order to meet that requirement. It will be understood, however, that there may be other ways of designing or arranging phase control circuits that would also meet the same requirement.

When the auxiliary P. C. board is connected to the main P. C. board, the circuits of FIGS. 6 through 9 then provide a complete system as illustrated and described in conjunction with FIG. 1. It will be understood, however, that the system may if desired be manufactured as a single unit. In that event, there would be no need to utilize separate printed circuit boards or the connectors that attach them together. And certain portions of the circuitry that are presently duplicated on the two separate circuit boards could, of course, be eliminated.

SYSTEM ARRANGEMENT WITH FULL-WAVE VOLTAGE CONTROLLER

(FIG. 11)

SECOND EMBODIMENT

Reference will next be made to FIG. 11 of the drawings which illustrate in a schematic block diagram the second preferred embodiment of the invention.

This embodiment utilizes a full-wave voltage controller 184 for connecting the three supply lines L1, L2, and L3 to the motor 10. The full-wave voltage controller 184 includes a pair of silicon controlled rectifiers SCR1 and SCR5 inversely connected in parallel in supply line L1, a pair of silicon controlled rectifiers SCR2 and SCR6 inversely connected in parallel in supply line L2, and a pair of silicon controlled rectifiers SCR3 and SCR7 inversely connected in parallel in supply line L3.

It should be noted that silicon controlled rectifiers SCR5, SCR6, and SCR7 in the respective supply lines L1, L2, and L3 control the current flow therethrough during each positive half cycle of the respective phase voltage while the silicon controlled rectifiers SCR1, SCR2, and SCR3 in the respective supply lines L1, L2, and L3 control the current flow therethrough during each negative half cycle of the respective phase voltage.

Since one of the silicon controlled rectifiers in each supply line conducts during the positive half cycle and the other conducts during the negative half cycle of the phase voltage, separate positive and negative half wave phase controls are provided for each of these phases A, B, and C.

It should be understood that each of the phase controls, such as the SCR1 control, includes an integrator a comparator and a trigger circuit.

In each positive half-wave phase control, namely the SCR5 control, the SCR6 control and the SCR7 control, a sawtooth waveform is generated by its integrator which is synchronized with the zero crossings of the phase voltage it receives. The sawtooth waveform is applied to the comparator and compared with a timing signal to provide a pulse that turns on the trigger circuit and determines the firing angle of the silicon controlled rectifier that conducts during the positive half cycle of the respective phase voltage.

In each negative half-wave phase control, namely the SCR1 control, the SCR2 control and the SCR3 control, the phase voltage is inverted and the sawtooth generated by the integrator is synchronized with the zero crossings of the inverted phase voltage. The sawtooth waveform is applied to the comparator and compared with a timing signal to provide a pulse that turns on the trigger circuit and determines the firing angle of the silicon controlled rectifier that conducts during the negative half cycle of the respective phase voltages.

In addition to these six silicon controlled rectifiers SCR1-SCR6 in the three supply lines L1, L2, and L3, a seventh silicon controlled rectifier designated SCR4 is connected across the motor ends of supply lines L1 and L2.

A selector circuit is provided for selecting the operation of the control circuit.

Initially, all silicon controlled rectifiers SCR1-SCR6 in the three supply lines L1, L2, and L3 are nonconducting. When it is desired to run the motor 10, the selector circuit is used to render the soft start control operable. This causes a soft start ramp signal, a signal with a positive ramp, as shown, to be applied to the comparators of all six of the phase controls for the respective six silicon controlled rectifiers. As a result, all six silicon controlled rectifiers SCR1-SCR6 in the three supply lines L1, L2, and L3 are triggered with an ever increasing firing angle to provide for gradually supplying the three phase power to the motor to control its acceleration. The phase controls then maintain full conduction through the six silicon controlled rectifiers SCR1-SCR6 in the three supply lines L1, L2, and L3 to enable the motor to run at its full rate of speed.

The selector circuit is then used to simultaneously render the soft start control inoperable and render the brake control operable. Thus, the soft start control no longer supplies the soft start ramp to the comparators of each of the six phase controls. Rather, the brake control provides for disabling, i. e., turning off, the SCR2 control and the SCR3 control, and provides for turning on and maintaining the firing of the silicon controlled rectifiers SCR5, SCR6, and SCR7 in the respective supply lines L1, L2, and L3, and also the free-wheeling silicon controlled rectifer SCR4. In addition, the brake control provides a constant level signal to the comparator of the SCR1 control to cause the silicon controlled rectifier SCR1 to conduct for a fixed portion of each negative half cycle. As a result, a pulsating D. C. current similar to that in the first embodiment is caused to flow through the silicon controlled rectifiers SCR6 in supply line L2 and SCR7 in supply line L3 into the motor and then out the silicon controlled rectifier SCR1 that is being controlled by the SCR1 control to conduct for a fixed portion of each negative half cycle to thereby brake the motor.

During the braking operation, the free-wheeling silicon controlled rectifier SCR4 provides for absorbing the inductive kickback generated at the end of each negative half cycle of the phase voltage conducting through the silicon controlled rectifier SCR1.

While the invention has been illustrated and described in detail in the drawings and the forgoing description, the same is considered as illustrative and not restrictive in character, it being understood that only the preferred embodiments have been shown and described and all changes and modifications that come within the spirt of the invention are also desired to be protected.

What is claimed is:

1. A soft start control circuit for a three phase induction motor conveniently modifiable so as to provide a dynamic braking function comprising:
    a source of three phase power having a first, second and third supply line;
    a selector circuit providing for operator selection of RUN and BRAKE modes;

a three phase voltage controller having silicon controlled rectifiers connected in said supply lines for connecting said source of three phase power to said motor;

another silicon controlled rectifier connected between two terminals of said three phase induction motor;

means to control the firing of said another silicon controlled rectifier;

means for providing an adjustable positive ramp signal;

means for providing a sawtooth wave form signal for and synchronized with each of said first, second and third supply lines; and a first, second and third phase control circuit means for controlling the firing angles of said silicon controlled rectifiers;

said first, second and third phase control circuit means being responsive to said positive ramp signal and said sawtooth waveform signal for controlling the firing angles of said silicon controlled rectifiers to provide a soft start for said motor; and means to provide an adjustable brake torque signal;

means to provide an adjustable brake timer signal determining the duration of said brake torque signal;

means to provide a second timer signal to become active at the termination of said brake timer signal;

said first phase control circuit means being responsive to said brake torque signal for controlling the firing angle of said silicon controlled rectifier in said first supply line to provide a dynamic brake for said motor; and means responsive to said second timer signal to discontinue said supply of three phase power on said first, second and third supply lines.

2. A soft start control for a three phase induction motor adaptable to be modified so as to include a braking function comprising:

a source of three phase power having a first, second and third supply line connected to said motor;

a three phase half-wave voltage controller including a silicon controlled rectifier connected in each of said supply lines;

a selector circuit providing for operator selection of RUN and BRAKE modes;

a motor contactor having a motor contact in each supply line for connecting said three phase supply to said half-wave voltage controller;

a first, second and third phase control circuit means for respectively controlling the firing angles of the silicon controlled rectifiers in the half-wave voltage controller;

each said phase control circuit means including an inverter, an integrator, a comparator, and a trigger circuit;

each said inverter being responsive to a respective supply line source of power and furnishing its output signal to said respective integrator;

each said comparator comprising an operational amplifier having an inverting and a noninverting input and responsive to output signal from said integrator;

each said integrator providing a sawtooth wave-form to the noninverting input of the comparator in said phase;

each said trigger circuit comprising an oscillating operational amplifier having an innverting and a noninverting input and responsive to output signal from said comparator;

the output of the comparator in each phase being connected to the inverting input of the oscillating operational amplifier in the trigger circuit of said phase;

a first circuit means providing a fixed voltage on the noninverting input of the oscillating operational amplifier in the first phase trigger circuit;

a second circuit means providing a fixed voltage on the noninverting inputs of the oscillating operational amplifiers in the second and third phase trigger circuits; and a first torque control circuit means for supplying a common positive ramp signal to the inverting input of each of said comparators;

whereby said trigger circuits provide trigger signals for controlling the silicon controlled rectifiers in each of the supply lines to provide a soft start for said motor; and a first multicontact connector accepting said common positive ramp signal on two of its contacts and having a first jumper for connecting said common positive ramp signal to a third of its contacts and having said second circuit means providing a fixed voltage on the noninverting inputs of the oscillating operational amplifiers in the second and third phase trigger circuits connected to a fourth contact and having a second jumper for connecting said fourth contact to a fifth contact of said multicontact connector and additionally having circuit operating voltages and circuit ground connected to remaining contacts.

3. A brake control for a three phase induction motor adaptable to be incorporated to effect the modification as defined in claim 2 including:

means to render said first torque control circuit inoperable;

a first timer responsive to be turned on when said first torque control circuit is rendered inoperable;

means to render said second and third phase control means inoperable;

a fourth trigger circuit comprising an oscillating operational amplifier having a noninverting and an inverting input;

a fourth circuit means operable when said timer is on for supplying a fixed voltage to the noninverting input of said fourth trigger circuit;

a free-wheeling silicon controlled rectifier connected across said first and second supply lines, and controlled to be fired by the output of said fourth trigger circuit; and a second torque control circuit means operable when said first timer is on for providing a constant level signal to the inverting input of said first phase comparator;

a second timer circuit responsive to be turned on when said first timer turns off and operable to open the contacts in said motor contactor.

4. A brake control circuit for a three phase induction motor as defined in claim 3 including connections comprising:

a second connector having a plurality of pins said second connector adapted for mating with said first multicontact connector such that corresponding pins thereon are electrically connected;

whereby said connections enable the combination of circuits to operate both as a soft start and as a dynamic brake for said motor.

5. A control circuit for a three phase induction motor comprising:
   a source of three phase power having a first, second and third supply line;
   a three phase voltage controller having silicon controlled rectifiers connected in said supply lines for connecting said source of three phase power to said motor;
   a silicon controlled rectifier connected across two of said supply lines;
   means for providing a positive going ramp signal of adjustable slope and adjustable initial level;
   means for providing a constant level signal;
   circuit means for providing a fixed D. C. voltage of preselected duration;
   a first, second and third phase control circuit means for controlling the firing angles of said silicon controlled rectifiers, each of said phase control circuit means comprising:
      an inverter circuit responsive to the voltage on a respective one of said supply lines, furnishing as its signal output a rectangular wave synchronized with the zero crossings of that respective supply line voltage;
      an integrator, driven by said inverter circuit and furnishing as its output signal a modified negative-going sawtooth signal having a constant positive level during the positive alternation of said respective supply line voltage and a negative-going ramp signal from said constant positive level during the negative alternation of said respective supply line voltage;
      a comparator, responsive to output signals from said positive going ramp signal and said modified negative-going sawtooth signal and furnishing as its output a negative, variable pulse-width rectangular pulse; and
      a trigger circuit responsive to output signal from said comparator and furnishing high frequency oscillations as its output for a time interval related to said negative, variable pulsewidth rectangular pulse;
   said first, second and third phase control circuit means being thus responsive to said positive ramp signal and said modified, negative going sawtooth signal for controlling the firing angles of said silicon controlled rectifiers to provide a soft start for said motor; and
   a trigger circuit responsive to said fixed D. C. voltage of preselected duration and furnishing high frequency oscillations as its output for gating said silicon controlled rectifier connected across two of said supply lines to its on state during said preselected duration;
   said first phase control circuit means being responsive to said constant level signal for controlling the firing angle of said silicon controlled rectifier in said first supply line to provide a dynamic brake for said motor.

6. The brake control of claim 3 wherein said means to render said first torque control circuit inoperable comprises:
   an initiator circuit having relay contacts operable to close when the RUN mode is selected and to open when the BRAKE mode is selected;
   a reset circuit actuated by opening said relay contact;
   a ramp signal generator comprising an operational amplifier having its output connected to its inverting input by means of a ramp storage capacitor and said output being also connected to said reset circuit;
   whereby said ramp storage capacitor is provided a discharge path and is thereby discharged upon actuation of said reset circuit.

7. The control circuit of claim 1 wherein each of said first, second and third phase control circuit means comprises:
   an inverter circuit responsive to the voltage on a respective one of said supply lines, furnishing as its signal output a rectangular wave synchronized with the zero crossing of that respective supply line voltage;
   an integrator, driven by said inverter circuit and furnishing as its output signal a modified negative-going sawtooth signal having a constant positive level during the positive alternation of said respective supply line voltage and a negative-going ramp signal from said constant positive level during the negative alternation of said respective supply line voltage;
   a comparator, responsive to output signals from said positive-going ramp signal and said modified negative-going sawtooth signal and furnishing as its output a negative, variable pulse-width rectangular pulse; and
   a trigger circuit responsive to output signal from said comparator and furnishing high frequency oscillations as its output for a time interval related to said negative, variable pulse-width rectangular pulse;
   wherein the output signal from said trigger circuits is furnished to respective pulse transformers for control of a gating signal thus controlling the firing angle of each of said silicon controlled rectifiers connected in said supply lines.

8. The control circuit of claim 1 wherein:
   said means to provide an adjustable brake timer signal further comprises:
      a first time delay circuit to defer immediate initiation of the timing cycle of said brake timer signal upon selection of the BRAKE mode;
      an enabling circuit having a second time delay circuit operative to prevent initiation of a brake timing cycle merely by the application of power thereto;
      a first timer circuit providing an output signal and having means to adjust the duration of said first timer circuit output signal;
      a third time delay circuit for the purpose of deferring the immediate application of said output signal;
      means to apply said output signal from said first timer circuit so as to disable said second and third phase control circuit means;
      means to apply said output signal from said first timer circuit so as to enable said means to control the firing of said another silicon controlled rectifier;
      means to apply said output signal from said first timer circuit so as to provide said brake torque signal; and
   said means to provide said second timer signal further comprises:
      a second timer circuit providing an output signal;

means to activate said second timer circuit at the termination of said output signal from said first timer circuit;

solid state relay means responsive to said output signal from said second timer circuit to discontinue said supply of three phase power on said first, second and third supply lines.

9. The control circuit of claim 8 wherein:

said first time delay circuit comprises:
means to provide circuit signal response to the selection of the BRAKE mode;
means to apply said circuit signal response to operation a first switching transistor so as to provide an output signal therefrom;
means to apply said output signal from said first switching transistor to a resistor-capacitor time delay circuit so as to delay said output signal;
means to apply said delayed output signal to operate a second switching transistor so as to activate said first timer circuit by the application of operating voltage thereto;

wherein said enabling circuit having a second time delay circuit comprises:
a third switching transistor dependent upon a second resistor-capacitor time constant delay for activation;
a third resistor-capacitor time constant circuit including a variable resistor operable to adjust the duration of said brake timer signal;

wherein said means to adjust the duration of said first timer circuit output signal is a variable resistor; and wherein said third time delay circuit is a resistor-capacitor time constant delay circuit.

10. The control circuit of claim 8 wherein:

said means to apply said output signal from said first timer circuit so as to disable said second and third phase control circuit means comprises:
a fourth switching transistor responsive to output signal from said first timer circuit so as to switch from its quiescent state to its conductive state;
a fifth switching transistor responsive to the conductive state of said fourth switching transistor so as to switch from its conductive state to its quiescent state;
means responsive to said conductive state of said fourth switching transistor to disable said second and third phase control means by removing operating voltage therefrom;
means responsive to said quiescent state of said fifth switching transistor to enable said means to control the firing of said another silicon controlled rectifier by applying operating voltage thereto;

wherein said means to apply said output signal from said first timer circuit so as to provide said brake torque signal comprises:
a sixth switching transistor responsive to said output signal from said first timer circuit so as to switch from its conductive state to its quiescent state;
a seventh switching transistor responsive to the quiescent state of said sixth switching transistor so as to switch from its quiescent state to its conductive state and thereby operable to activate said brake torque signal by applying operation voltage thereto; and wherein said means to provide a second timer signal to become active at the termination of said brake timer signal includes a timer circuit responsive to the termination of said output signal from said brake timer signal so as to provide an output signal therefrom;
an eight switching transistor responsive to said output signal so as to switch from its conductive state to its quiescent state;
a time delay circuit for delaying application of said output signal to said switching transistor; and
a solid state relay operable to become open upon the assumption of the quiescent state of said switching transistor.

11. The brake control of claim 3 wherein said means to render said second and third phase control means inoperable comprises:
a first two-stage transistor switching circuit responsive to operate upon said first torque control circuit becoming inoperable and furnishing operating voltage to said first timer responsive to be turned on when said first torque control circuit is rendered inoperable;
a second two-stage transistor switching circuit responsive to output signal from said first timer and operable to remove operating voltage from the trigger circuits of said second and third phase control circuit means;
wherein said second two-stage transistor switching circuit additionally operates to supply operating voltage to said fourth trigger circuit.

12. The brake control of claim 11 wherein:

said second torque control circuit means operable when said first timer is on comprises a third two-stage transistor switching circuit responsive to a condition of said second two-stage transistor switching circuit resulting from selection of the BRAKE mode so as to furnish operating voltage to a variable resistor having its wiper connected so as to furnish said constant level signal to said inverting input of said first phase comparator; and wherein said second timer circuit responsive to be turned on when said first timer turns off comprises:
a timer having an output signal;
a switching transistor responsive to said output signal; and
a solid state relay responsive to said switching transistor and connected so as to open contacts in said selector circuit so as to open said motor contacts in said motor contactor.

* * * * *